US 9,002,730 B2

(12) United States Patent
Postrel

(10) Patent No.: US 9,002,730 B2
(45) Date of Patent: Apr. 7, 2015

(54) METHOD AND SYSTEM FOR GENERATING LOCATION BASED PURCHASE INCENTIVES BASED ON PREDICTED ROUTE OF TRAVEL

(76) Inventor: Richard Postrel, Miami Beach, FL (US)

(*) Notice: Subject to any disclaimer, the term of this patent is extended or adjusted under 35 U.S.C. 154(b) by 11 days.

(21) Appl. No.: 13/371,402

(22) Filed: Feb. 11, 2012

(65) Prior Publication Data

US 2012/0271717 A1 Oct. 25, 2012

Related U.S. Application Data

(63) Continuation-in-part of application No. 12/905,651, filed on Oct. 15, 2010, now abandoned, which is a continuation of application No. 12/726,505, filed on Mar. 18, 2010, now Pat. No. 8,195,507, which is a continuation of application No. 10/835,547, filed on Apr. 28, 2004, now Pat. No. 7,716,080.

(51) Int. Cl.
*G06Q 40/00* (2012.01)
*G06Q 30/02* (2012.01)
*G06Q 20/32* (2012.01)

(52) U.S. Cl.
CPC ............ *G06Q 30/02* (2013.01); *G06Q 30/0207* (2013.01); *G06Q 30/0267* (2013.01); *G06Q 40/00* (2013.01); *G06Q 20/3224* (2013.01); *G06Q 30/0261* (2013.01)

(58) Field of Classification Search
CPC ... G06Q 40/00; G06Q 30/02; G06Q 30/0267; G06Q 20/3224; G06Q 30/0207
USPC ................. 705/14, 14.27, 14.31, 14.35, 14.5, 705/14.53, 14.57, 15.58
See application file for complete search history.

(56) References Cited

U.S. PATENT DOCUMENTS

| 8,073,460 | B1 * | 12/2011 | Scofield et al. ............ 455/456.1 |
| 8,412,234 | B1 * | 4/2013 | Gatmir-Motahari et al. ........................ 455/456.1 |
| 2003/0216960 | A1 * | 11/2003 | Postrel ............................ 705/14 |
| 2006/0010033 | A1 | 1/2006 | Thomas |
| 2007/0174259 | A1 * | 7/2007 | Amjadi ............................ 707/3 |
| 2008/0195456 | A1 * | 8/2008 | Fitzpatrick et al. ............... 705/9 |
| 2009/0005973 | A1 * | 1/2009 | Salo et al. ..................... 701/209 |
| 2009/0150218 | A1 * | 6/2009 | Brunner et al. ................. 705/10 |
| 2009/0182597 | A1 * | 7/2009 | Bull et al. ......................... 705/7 |
| 2011/0166936 | A1 * | 7/2011 | Dixon et al. ............... 705/14.58 |
| 2011/0191184 | A1 * | 8/2011 | Blackhurst et al. ........ 705/14.57 |
| 2011/0208575 | A1 * | 8/2011 | Bansal et al. .............. 705/14.25 |

(Continued)

OTHER PUBLICATIONS

Crouch, C. (2000). Service offers to beam coupons to your PDA. PC World.Com, , 1. Retrieved Feb. 9, 2015.*

*Primary Examiner* — Kito R Robinson
(74) *Attorney, Agent, or Firm* — Barkume & Associates, P.C.

(57) ABSTRACT

Providing a purchase incentive to a mobile device based for example the user's location, predicted route of travel, and prior transactions. A tracking server computer determines a number of locations of a mobile device as it travels along a route and an associated timeframe when it is at each of the locations. The tracking server computer records the locations and associated timeframes in a location log and analyzes the location log to predict a subsequent location and associated timeframe that the mobile device will be at that location. The tracking server computer then determines a merchant proximate to the predicted subsequent location of the mobile device and generates a purchase incentive for use at the merchant and delivers the purchase incentive to the mobile device. In the alternative, the incentive may be generated by a merchant computer or the mobile device.

38 Claims, 10 Drawing Sheets

(56) References Cited

U.S. PATENT DOCUMENTS

2011/0251882 A1* 10/2011 Richard ..................... 705/14.25
2011/0258049 A1* 10/2011 Ramer et al. ............... 705/14.66
2012/0158508 A1* 6/2012 Kilroy et al. ............... 705/14.58
2012/0197720 A1* 8/2012 Bezancon et al. ......... 705/14.53
2012/0226434 A1* 9/2012 Chiu ............................. 701/117

* cited by examiner

US 9,002,730 B2

METHOD AND SYSTEM FOR GENERATING LOCATION BASED PURCHASE INCENTIVES BASED ON PREDICTED ROUTE OF TRAVEL

CROSS-REFERENCE TO RELATED APPLICATIONS

This application is a continuation-in-part application of Ser. No. 12/905,651 filed Oct. 15, 2010, which is a continuation application of Ser. No. 12/726,505 filed Mar. 18, 2010, now U.S. Pat. No. 8,195,507 which is continuation application of Ser. No. 10/835,547 filed Apr. 28, 2004 now U.S. Pat. No. 7,716,080 issued May 11, 2010. This application is also related to application Ser. No. 13/325,739, METHOD AND SYSTEM FOR PROVIDING LOCATION-BASED INCENTIVES AND PURCHASE OPPORTUNITIES TO REWARD PROGRAM MEMBERS, filed Dec. 14, 2011.

TECHNICAL FIELD

This invention relates shopping incentives based on user location, and in particular to the generation of a purchase incentive such as a coupon based on the user's location, predicted route of travel, and prior transaction history.

BACKGROUND OF THE INVENTION

Purchase incentives such as coupons, rebates, discounts, reward points and the like are a valuable tool in giving users an incentive to transact commerce with a certain merchant. Mobile commerce has benefitted greatly since the mobility of a user may be leveraged by the use of a mobile device such as a smartphone, tablet, or smart card. Since the mobile device usually has a screen and communications means such as a wireless data connection, the mobile device may be able to receive a coupon and display it to the user and merchant at which the coupon may be redeemed.

It is desired however to be able to leverage the location aware functionalities of a mobile device such as a smartphone in order to customize a purchase incentive for a user based on his location, predicted route of travel, and prior transaction history.

SUMMARY OF THE INVENTION

The present invention is a method and system for providing a purchase incentive to a user's mobile device based on several parameters including but not limited to the user's location, predicted route of travel, and prior transaction history. In a first embodiment, a tracking server computer determines a number of locations of a mobile device as the mobile device travels along a route and an associated timeframe when the mobile device is at each of the locations (for example by receiving location signals from the mobile device including GPS data). The mobile device may for example be a smart card, a handheld computing device, a smartphone, or a tablet computer. The tracking server computer records the locations and associated timeframes in a location log and analyzes the location log to predict a subsequent location and associated timeframe that the mobile device will be at that location. For example, the tracking server computer analyzes the location log to predict a subsequent location and associated timeframe of the mobile device by analyzing a frequency of the locations occurring in the location log. The tracking server computer then determines a merchant proximate to the predicted subsequent location of the mobile device. The tracking server computer generates a purchase incentive for use at the merchant and delivers the purchase incentive to the mobile device. The tracking server computer may be programmed to generate a purchase incentive for use at the merchant on the occurrence of a triggering event, which may be a predetermined condition (a push embodiment) and/or a user request from the mobile device (a pull embodiment). The purchase incentive may be effective only for the timeframe associated with the predicted subsequent location.

In a variation of this first embodiment, the tracking server computer may also analyze a prior transaction log associated with the mobile device, which includes records of prior transactions executed by the mobile device. In this case, the tracking server computer generates the purchase incentive based on the prior transaction log (which may be stored on the mobile device, the tracking server computer, and/or a merchant computer). The purchase incentive may be generated for use with a merchant associated with the prior transaction log, or for use with a merchant not associated with the prior transaction log. The purchase incentive may be based on a type of prior transactions executed by the mobile device, or it may be based on a value of prior transactions executed by the mobile device.

In a second embodiment of the invention, a merchant computer generates the purchase incentive (rather than the tracking server computer) and provides the token back to the tracking server computer which delivers it to the mobile device. In this case, the tracking server computer determines a number of locations of a mobile device as the mobile device travels along a route and an associated timeframe when the mobile device is at each of the plurality of locations (for example by receiving location signals from the mobile device including GPS data). The mobile device may for example be a smart card, a handheld computing device, a smartphone, or a tablet computer. The tracking server computer records the locations and associated timeframes in a location log and analyzes the location log to predict a subsequent location and associated timeframe that the mobile device will be at that location. For example, the tracking server computer analyzes the location log to predict a subsequent location and associated timeframe of the mobile device by analyzing a frequency of the locations occurring in the location log. The tracking server computer then determines a merchant proximate to the predicted subsequent location of the mobile device. The tracking server computer informs a merchant computer associated with the merchant to which the mobile device is predicted to be proximate. The merchant computer in turn generates a purchase incentive for use at the merchant and sends the purchase incentive to the tracking server computer. The merchant computer may be programmed to generate a purchase incentive for use at the merchant on the occurrence of a triggering event, which may be a predetermined condition (a push embodiment) and/or a user request from the mobile device (a pull embodiment). The tracking server computer then delivers the purchase incentive to the mobile device. The purchase incentive may be effective only for the timeframe associated with the predicted subsequent location.

In a variation of this second embodiment, the merchant computer may also analyze a prior transaction log associated with the mobile device, which includes records of prior transactions executed with the mobile device. In this case, the merchant computer generates the purchase incentive based on the prior transaction log. The purchase incentive may be based on a type of prior transactions executed by the mobile device, or it may be based on a value of prior transactions executed by the mobile device.

In a third embodiment of the invention, the merchant computer generates the purchase incentive (rather than the tracking server computer) and delivers the token directly to the mobile device (rather than through the tracking server computer). In this case, the tracking server computer determines a number of locations of a mobile device as the mobile device travels along a route and an associated timeframe when the mobile device is at each of the plurality of locations (for example by receiving location signals from the mobile device including GPS data). The mobile device may for example be a smart card, a handheld computing device, a smartphone, or a tablet computer. The tracking server computer records the locations and associated timeframes in a location log and analyzes the location log to predict a subsequent location and associated timeframe that the mobile device will be at that location. For example, the tracking server computer analyzes the location log to predict a subsequent location and associated timeframe of the mobile device by analyzing a frequency of the locations occurring in the location log. The tracking server computer then determines a merchant proximate to the predicted subsequent location of the mobile device. The tracking server computer informs a merchant computer associated with the merchant to which the mobile device is predicted to be proximate. The merchant computer in turn generates a purchase incentive for use at the merchant and delivers the purchase incentive to the mobile device. The merchant computer may be programmed to generate a purchase incentive for use at the merchant on the occurrence of a triggering event, which may be a predetermined condition (a push embodiment) and/or a user request from the mobile device (a pull embodiment). The purchase incentive may be effective only for the timeframe associated with the predicted subsequent location.

In a variation of this third embodiment, the merchant computer may also analyze a prior transaction log associated with the mobile device, which includes records of prior transactions executed with the mobile device. In this case, the merchant computer generates the purchase incentive based on the prior transaction log. The purchase incentive may be based on a type of prior transactions executed by the mobile device, or it may be based on a value of prior transactions executed by the mobile device.

In a fourth embodiment of the invention, the use of a tracking server computer is not required, and substantially all functionality occurs within the mobile device. Thus, the fourth embodiment is a mobile device executing an application (app) that determines a number of locations of the mobile device as the mobile device travels along a route and an associated timeframe when the mobile device is at each of the plurality of locations (for example by analyzing GPS coordinate data of the mobile device). The mobile device may for example be a smart card, a handheld computing device, a smartphone, or a tablet computer. The mobile device app records the locations and associated timeframes in a location log and analyzes the location log to predict a subsequent location and associated timeframe that the mobile device will be at that location. For example, the mobile device app analyzes the location log to predict a subsequent location and associated timeframe of the mobile device by analyzing a frequency of the locations occurring in the location log. The mobile device app then determines a merchant proximate to the predicted subsequent location of the mobile device. The mobile device app then generates a purchase incentive for use at the merchant. The mobile device may be programmed to generate a purchase incentive for use at the merchant on the occurrence of a triggering event, which may be a predetermined condition (a push embodiment) and/or a user request to the mobile device (a pull embodiment). The purchase incentive may be effective only for the timeframe associated with the predicted subsequent location.

In a variation of this fourth embodiment, the mobile device app may also analyze a prior transaction log associated with the mobile device, which includes records of prior transactions executed by the mobile device. In this case, the mobile device app generates the purchase incentive based on the prior transaction log (which may be stored on the mobile device and/or a merchant computer). The purchase incentive may be generated for use with a merchant associated with the prior transaction log, or for use with a merchant not associated with the prior transaction log. The purchase incentive may be based on a type of prior transactions executed by the mobile device, or it may be based on a value of prior transactions executed by the mobile device.

DESCRIPTION OF THE PREFERRED EMBODIMENTS

The present invention is based on the use of a mobile device such as a smartphone, tablet, or multi-function card (e.g. smart card), which may be utilized by a user for any of various applications programmed therein, such as a credit card, debit card, check card, loyalty card, insurance card, medical card, etc. The mobile device is utilized in two major aspects as now described herein.

In one aspect, the mobile device also allows for reward points and/or other types of values to be accumulated and stored every time the device is used for associated application. For example, if a user uses his mobile device to pay for a hotel that normally gives reward points, those reward points may be stored on the mobile device in an account associated with that hotel. Likewise, when the mobile device is used for the purchase of an airline ticket, the reward points awarded by that airline would be added to the mobile device in a reward account associated with the airline. The user may then redeem the accumulated reward points by presenting the mobile device to a reading device or terminal associated with a computer connected to the Internet or other authorized communication system (e.g. an ATM or other reader). Information provided to the user regarding the user's reward points may be updated after every transaction.

Figure 1:
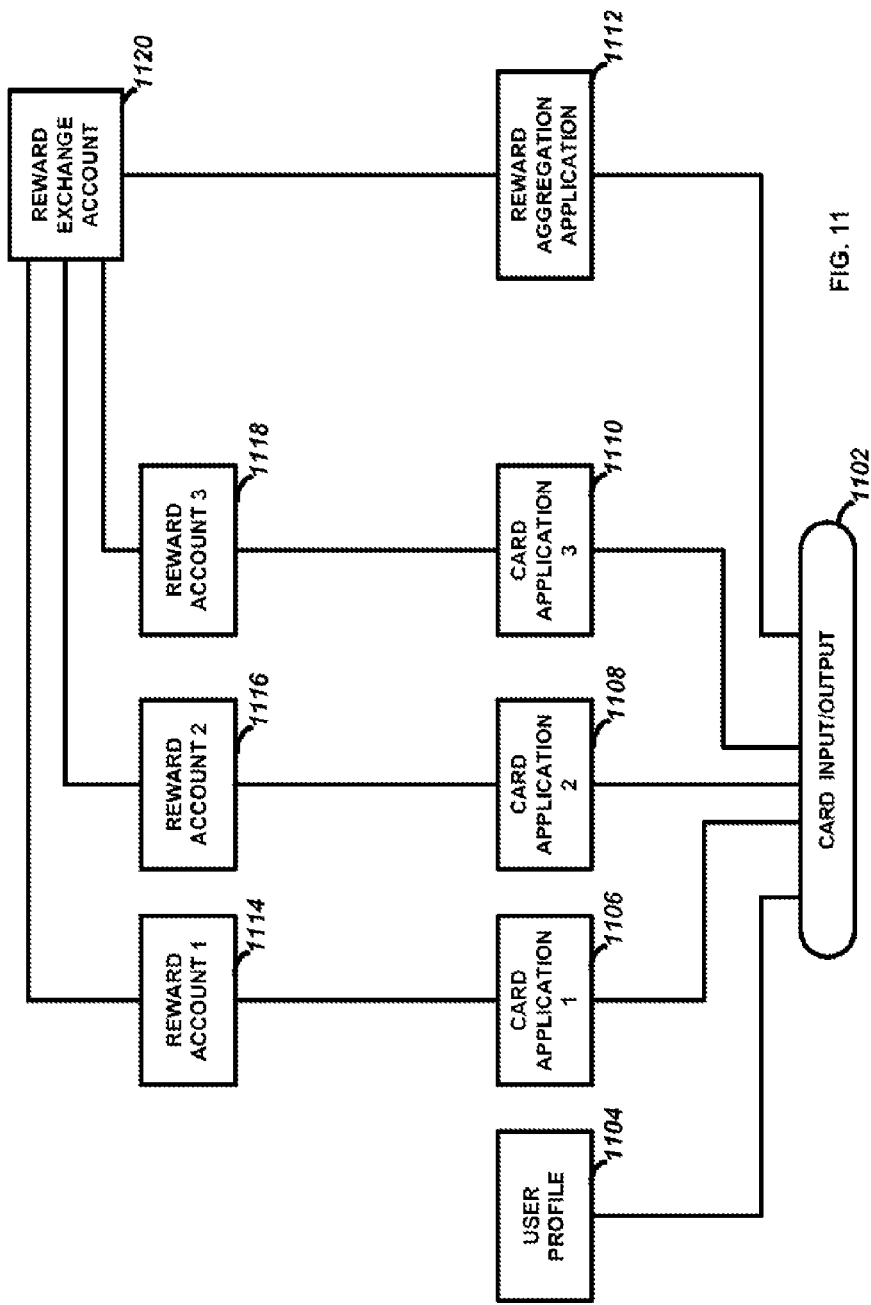
FIG. 1 is an illustration of the use of a portable device such as a smart card with one aspect of the present invention.

FIG. 1 illustrates a functional block diagram of a mobile device such as a multi-function card under this aspect of the invention. The device has processing circuitry such as a microprocessor or microcomputer, program storage, data memory, and input/output functions adapted to perform the functions as described herein. This example illustrates three applications—card application 1 1106, card application 2 1108, and card application 3 1110—although many more applications may be implemented as desired. Typical examples of card applications are a credit card application, debit card application, check card application, medical card application, insurance card application, loyalty card application, and the like. For example, this card may have a CITIBANK VISA application, an AMERICAN EXPRESS application, and a WALGREENS DRUGSTORE application stored thereon.

FIG. 1 also illustrates three reward accounts, each associated with each of the card applications. Thus, reward account 1 1114 would be a CITIBANK VISA reward account, reward account 2 1116 would be an AMERICAN EXPRESS reward account, and reward account 3 1118 would be a WALGREENS reward account. These reward accounts are adapted to store reward points that are issued by the respective entities based on purchases made from that entity (in the case of WALGREENS) or purchases made using the credit card application of that entity (in the case of the CITIBANK VISA or AMERICAN EXPRESS applications). Thus, if a user purchases $50 worth of goods from WALGREENS using the multi-function card, then he would receive 50 reward points from WALGREENS that are stored in the WALGREENS reward account 1118 on the multi-function card. Note that if the user uses his CITIBANK VISA application to pay for the goods, then he may also receive 50 reward points from CITIBANK VISA that are stored in the CITIBANK VISA reward account 1114. The device may also store in memory a user profile 1104, which performs several functions to be described further herein. The user will be provided with the ability to select the desired card application 1106, 1108, 1110 at any time. For example, a user may want to make a purchase at a merchant using the CITIBANK VISA credit card application 1106 on the smart card. He can select the CITIBANK VISA application at the point of sale by various means as known in the art, such as by buttons or other input mechanisms on the device, or by selecting an application from a display screen (e.g. after the device is read by an appropriate terminal. The terminal is interconnected to an appropriate network as known in the art (such as the CHASE network). Once the CITIBANK VISA application is selected, he may be given a choice of making payment for the item with (1) credit from the CITIBANK VISA account, (2) reward points or other values from his CITIBANK VISA reward account 1114 on the smart card, (3) aggregated reward points from his exchange account 1120 on the smart card (to be described later), or (4) any combination of the above. If he chooses (1), then he may be awarded CITIBANK VISA reward points which would be logged in his CITIBANK VISA reward point account 1114 on the smart card. If he chooses (2), (3) or (4), then the appropriate number of reward points would be deducted from the reward points account 1114 and/or reward exchange account 1120 (to be described later) and applied towards the purchase of the item.

A default account may be assigned so that when a user presents the mobile device to a POS terminal, that default account is used unless another is specified. The default account to be used (e.g. CITIBANK VISA) may depend on the purchase involved, or upon the merchant with which the card is being used. For example, the card may be programmed to use the CITIBANK VISA application 1106 whenever the user presents the card at a supermarket, but the card may be programmed to switch to the AMERICAN EXPRESS application 1108 when the card is presented at a gas station. These default scenarios may be stored on the card in the user profile 1104, which may be changed by a user as described further herein. Of course, these defaults may be overridden by the user if so desired at the point of sale.

As previously mentioned, the integration of the credit card and loyalty card functionality allows reward points to be granted to the user based on the credit card transaction, and then directly deposited into the local memory of the device. Likewise, the user may opt to use points from his local (or remote) rewards account in order to pay for the purchase (in whole or in part). Thus, a user may use the mobile device of the present invention to pay for an item, and then be given the following options at the POS:

POINT TOTAL ACCRUED: ___
POINTS TO BE AWARDED FOR CURRENT TRANSACTION: ___
POINTS USABLE FOR CURRENT TRANSACTION: ___
  HOW MANY POINTS DO YOU WANT TO APPLY TO CURRENT TRANSACTION?___
PRICE IF POINTS USED AS ENTERED ABOVE: ___
POINTS REMAINING IF POINTS USED AS ENTERED ABOVE: ___

The user may then make the desired selection and the transaction will proceed accordingly.

A reward point aggregation exchange account 1120 may also be stored in memory on the mobile device. Reward point aggregation is described in detail with respect to a central server system in U.S. Pat. No. 6,594,640, SYSTEM FOR ELECTRONIC BARTER, TRADING AND REDEEMING POINTS ACCUMULATED IN FREQUENT USE PROGRAMS, which is assigned to the assignee of this invention, the specification of which is incorporated by reference herein. patent. Reward point aggregation allows a user to combine points from multiple disparate reward accounts into a single exchange account, and use the aggregated points for purchases of good and services. Thus, a user may choose to exchange 500 points from his WALGREENS reward account 1118 and 2,400 reward points from his AMERICAN EXPRESS reward account 1116 into his reward exchange account 1120. Assuming a one-to-one conversion ratio (which may be different according to the exchange arrangements made between the participating entities), then the user would have 2,900 aggregated reward exchange points in his exchange account 1120 as a result of the exchanges. These 2,900 points may then be used to make purchases from participating merchants. Consideration will be exchanged between all participating parties to account for the points exchanged, as described further in the '640 patent. For example, the exchange entity associated with the reward exchange account 1120 (which may be an independent third party, a party issuing the mobile device, or one of the individual reward-issuing entities described above) will receive consideration from the entity that exchanges reward points into the exchange account. In a simple example, when the user exchanges 500 WALGREENS reward points from his WALGREENS account 1118 into the exchange account 1120, then WALGREENS will also convey consideration related to those 500 points (e.g. $5.00 if the points have a value of one penny per point) to the exchange entity in exchange for taking the WALGREENS points off of WALGREENS account. Since reward points issued by the issuing entity are a liability of the issuing entity, the issuing entity will pay the exchange entity for assuming that liability. As a result, although the exchange entity will now have a 500 point liability to the user after the exchange, it has also gained $5.00 to settle that liability when the user chooses to redeem his exchange points with a merchant. Discounts may be taken by any party in the transaction to account for the costs of implementing the program. Thus, the exchange entity may only credit the user with 450 points after the exchange transaction, such that it has only a $4.50 liability to the user on redemption of the exchanged points, resulting in a 50 cent (10%) fee on the exchange. Alternatively, the exchange entity may give full 500 points credit to the user but charge him a transaction fee on the exchange and/or the redemption transaction.

A user may be given access to the individual and exchange reward accounts, for example after presentation into a device reader or terminal, so that he may control (using reward aggregation application 1112) reward point exchanges between the individual reward point accounts 1114, 1116, 1118 and the reward point exchange account 1120 as described above. The user can then use the aggregated reward points from the exchange account 1120 on the smart card to make purchases at merchants that agree to accept the aggregated points.

Optionally, the mobile device reward point account totals may, if desired, be reconciled at some point with the entities that are associated with the respective reward accounts. For example, if a user has a CITIBANK VISA reward points account 1114 on his smart card, then he may enter the card into a smart card reader or terminal, and the terminal may communicate with the appropriate CITIBANK VISA server computer over a network to reconcile his account with the server. If communications with the appropriate server is not available during a transaction, then a flag will be set in the device memory to indicate that a reconciliation must be done at the next available time (i.e. the next time communications is established with the server). This will enable CITIBANK VISA as the issuing entity to determine how many reward points may be outstanding (i.e. its liability in reward points). In addition, reward points that have been aggregated into the exchange account 1120 may also be reconciled with the exchange entity (the entity that operates the points trading system).

The mobile device may store multiple reward accounts issued by a single entity, wherein each account is individually tracked and utilized by the user but wherein the accounts may be aggregated into an exchange account as previously described. For example, a user may hold several VISA accounts issued by one or more issuing banks (such as a VISA RED account, a VISA BLUE account, and a VISA WHITE account), and the user will use whichever VISA account desired for a given transaction or application. Each account is separately tracked, funded, and reconciled, and the reward points may be aggregated into the exchange account 1120 if desired. In another example, a user may hold various CITIBANK accounts on his smart card, such as a CITIBANK VISA and/or MASTERCARD, a CITIBANK investment account, a CITIBANK mortgage account, etc. and selectively redeem and/or aggregate reward points as previously described.

In one embodiment, accounts associated with various loyalty programs may be stored on a mobile device, wherein the various loyalty programs are configured with points that are either partially funded or fully funded. A fully funded reward program provides reward points to users for purchasing products, for using their services, etc., wherein the reward points are fully accounted for on the accounting books of the entity. In a partially funded program, only a portion of the reward points may be accounted for on the books of the rewarding entity, or all of the points may be accounted for but at a discounted (partial) value. By storing the various programs on a single mobile device, the user may be able to easily aggregate points from all of the programs into the exchange account as described herein. As previously mentioned, the present invention allows various types of values (such as reward points, coupons, rebates, etc.) to be stored from different entities. In an alternative embodiment, certain combinations of values may provide a greater value as a result of aggregation. For example, a pizza restaurant may provide points towards free pizzas, which would be stored on a pizza account on the mobile device. Similarly, a supermarket may provide points for purchasing soda, which would be stored on a soda account on the mobile device. In addition to (or in the alternative to) trading in points for pizza and/or sodas directly, the user may aggregate the values provided by each of the entities to obtain a sweepstakes entry sponsored by both entities. That is, by aggregating the values provided by both reward issuing entities, the user may be able to obtain the individual rewards as well as a reward obtainable only by aggregating the values together (the sweepstakes entry). In another embodiment of the present invention, a consumer is provided with a mobile device such as a multi-function card that is sponsored by a retail store or chain of stores such as a drugstore such as WALGREENS. In order to obtain the card, the consumer must go through a registration process, where he or she provides personal data such as name, address, telephone number, email address, etc., as well as demographic data such as age and gender. This profile data may be compiled (and optionally stored in the user profile 1104 on the card) and used for marketing purposes, alone or in conjunction with shopping pattern data collected and stored on the card during its use.

After completing the registration process, the consumer is provided with the multi-function card that has a unique account number printed thereon (as well as encoded in a bar code and/or magnetic stripe). The initial function of the multi-function smart card is a loyalty card for frequent shoppers. When the consumer makes a subsequent purchase at the drugstore, then he gives the cashier his loyalty card and the card is swiped, dipped, or otherwise entered into the POS terminal. Data is captured regarding the products purchased by the consumer, the consumer's account number, the prices paid, etc. In addition, points will be credited to the consumer's account, typically in the amount of one point per dollar spent. Thus, a purchase totaling $54.00 will net the consumer 54 points. In the alternative, the points may be credited as a function of the amount spent (e.g. purchases over $100 yield a 1.5 point per dollar ratio), or as a function of purchasing certain classes products (e.g. vitamins yield a 1.25 point per dollar ratio) or as a function of purchasing certain brands of products (e.g. all COKE products provide a 2 point per dollar ratio), etc. The points are then stored in the associated reward account on the multi-function card.

Thus, the consumer will accumulate reward points over time based on his or her purchase at the merchant. Since the reward points are stored locally on the smart card, the consumer will be able to dip the smart card into a smart card reader terminal (such as a kiosk in a public area or a terminal connected to a personal computer) and access the data stored thereon.

In addition to reward points, other rewards in the present invention may be in the form of coupons, rebates, and/or a sweepstakes entry for the consumer. For example, at certain intervals of points accumulation (e.g. for every 500 points), the consumer may be provided with a sweepstakes entry (and the points account may optionally be reduced accordingly). The sweepstakes entry may be in the form of a paperless entry (electronic only), wherein the clerk at the cash register will be provided with a message that the consumer has reached an award level and is being awarded a sweepstakes entry. The trigger that indicates that a sweepstakes reward has been provided may come from an external server or from the mobile device itself. The cashier might then say "Congratulations Mr. Smith, you have just been awarded an entry into our monthly sweepstakes, in which you may win $5,000". In addition, the POS terminal may be adapted to print out a coupon that evidences the sweepstakes entry, and the cashier would then give the coupon to the consumer accordingly. In addition, the consumer may be notified by email, regular mail, telephone, etc. Once the sweepstakes is held, the winner(s) may be notified by using the information provided at registration. In another aspect of the invention, the mobile device implements location aware technologies to attain various new functionalities. For example, a mobile device such as a multi-function smart card may have has an RFID transponder chip embedded or otherwise attached to it. RFID technology is known in the art and enables a mating transponder to determine if the RFID chip is within its proximity, and it can read a unique identifier associated with the RFID chip to ascertain which particular card (and which consumer associated with that card) is within its proximity at any given time. The retail establishment will have a number of mating fixed-location transponders located strategically throughout the store, such as one or more at every aisle, one at the entry point, one at each POS terminal, etc. The fixed-location transponders are also interconnected to a network in the store, which also has a tracking server computer. By communicating with each of the fixed-location transponders, the tracking server will be able to determine if an RFID-enabled card is within proximity to any one or more of the fixed-location transponders at a given time. This tracking information may be compiled by the tracking server computer and analyzed in real time or offline to track the path of the card around the store as the consumer shops in the store.

For example, the tracking server will be able to determine when a certain customer has entered the store, which aisles he visits and for how long, and when the customer goes to the POS checkout terminal. By utilizing enough fixed-location transponders, the tracking server computer may benefit from enough granularity to ascertain if a certain customer stops at a certain location in an aisle and how long he may dwell there.

This information is useful when used in conjunction with data obtained from an actual sale to that consumer. For example, the tracking server may determine that John Smith entered the store at 3:05 PM, and proceeded to the magazine aisle, where he lingered for 15 minutes before moving on to another aisle. The system will see that he did not purchase any magazines (only vitamins) notwithstanding his long stay in the magazine aisle. This event-based geocentric information may be utilized by the system in various ways. For example, Mr. Smith may be given a coupon at checkout for a discount on a magazine, since he showed an interest in a magazine but did not purchase one. Or, he may be told by the cashier that he will get increased reward points in his reward account if he purchases a magazine now or at a later date (e.g. "Mr. Smith, you will get double reward points if you purchase a magazine today or the next time you come in"). In addition, the system may use the customer location tracking information to award points and/or coupons for products sold in an area of the store that was not visited by the consumer (e.g. "Mr. Smith, we see that you have not visited our gift card aisle—we would like to give you a $1 coupon (or double reward points) for you to make a purchase of an item from that aisle.") This incentive will help drive shoppers to parts of a store that may otherwise suffer from low amounts of traffic.

Reward points may also be awarded based on the user simply visiting certain locations of the store (or perhaps by staying near a location for a certain time period), since the RFID chip will enable the store's tracking system to determine the location of the user at any time. After the user executes a transaction with the store's system, the earned reward points may be added to the user's reward account on the smart card accordingly. For example a user may earn 50 points for browsing near the soda aisle, or 100 points for staying near the vitamins aisle. These points would be held temporarily by the store's system until the user checks out and swipes his smart card, thus enabling the 150 points to be added to the user's smart card. The location tracking may be combined with the actual purchases made by the user, such that browsing in a certain aisle, accompanied by the purchase of a certain product, would yield a certain number of points.

When a user who is carrying this smart card enters a store with appropriate RFID tracking devices, the tracking device will be able to determine the identity of the user via information exchanged between the smart card and the tracking device (e.g. a user identification number). The system will be able to generate personalized offers based on prior shopping history as well as a user profile that may be stored in the system's server. For example, when a user enters a store with the RFID technology enabled, the system may determine that he usually purchases soda and snacks, and then the system can generate offers, coupons, or other incentives related to these products and present them to the user as soon as he enters the store via a kiosk or the like. The offers may be printed out, or they may be electronically displayed. In the alternative, the user may be requested to insert his smart card into a reader terminal, after which the system will be able to generate the offers and either load them into the smart card memory and/or display them to the user to aid in his shopping. In the event that the user inserts his card into a reader terminal, then the system can use the profile information directly from the smart card and need not refer to a central server for this purpose. A user would be able to access the data stored in his smart card (i.e. his account totals) by inserting the card into a reader associated with a computer such as a personal computer at home. The user would then be able to see the totals of each of his reward accounts, his exchange account, etc., and also be provided with the ability to control exchanges between accounts. For example the user could insert his smart card into a terminal, and a window would automatically pop up on his screen showing the various account totals, etc. By using his mouse or keyboard, he could make the desired exchanges. Any reconciliation that must be made with the reward issuing entities may be done at the same time over a networked connection such as the Internet.

In addition, the card may be configured to store purchase incentives, such as rebates and coupons. For example, the card may be programmed with one or more purchase coupons that may be used at the point of sale by the consumer. The consumer would use the multi-function card when making the purchase, and the UPC or other product identifier would be scanned at the POS terminal and then compare to any coupon files stored on the card. If there is a match for that UPC, then the coupon discount would be applied, and the coupon may be optionally deleted from the card (if it is a one-time use coupon).

Similarly, rebates may be stored on the card. In one example, a rebate for $3.00 for the purchase of a certain DVD is stored on the card. When the consumer buys the DVD with the card, the rebate data appears at the POS terminal and the consumer is given a form to send in to get the rebate. The rebate may arrive as a check in the mail, or it may be posted to the account in the card immediately. Rebates may be added to the card at a POS transaction as well, such as when the POS terminal adds a rebate to the card memory after purchase of a certain item.

Rebates and coupons may be added at the POS terminal, or they may be added at any smart card kiosk that can interoperate with the card. For example, the consumer may have a smart card reader connected to a home computer. The consumer may dip the smart card into the reader, log onto a server over the Internet, and exchange coupon and rebate data accordingly. Rebates may be added to the smart card memory, or the rebate may be executed for a prior purchase wherein the purchase record is read by the server and the rebate amount is credited to the consumer's account. Further embodiments implementing a purchase incentive are described below.

A user profile may be stored in the mobile device. The user profile would contain various information regarding the user, including but not limited to any or all of the following types of information: name, address, social security number, age, gender, income, demographics, psychographics, biometrics, names of various rewards accounts, passwords, prior purchase history including details of transactions executed, and preferences. Preferences may indicate which accounts on the portable device that the user would prefer to utilize in certain situations as mentioned above; e.g. use the VISA application at supermarkets but use the AMERICAN EXPRESS application at gasoline stations. Preferences may also indicate how the user would like to utilize reward accounts; e.g. he would prefer to pay for an item with 50% points and 50% credit, or he would prefer to pay for business expenses with credit only and personal expenses with points only, etc. These user preferences may be modified and accessed by the user, such as when the mobile device is a smart card it is inserted into an appropriate reader or terminal as known in the art. These user preferences may also be utilized by the various applications stored in and executed by the smart card as required. For example, when the user presents the mobile device to pay for gasoline, the purchase application may check the user profile to determine (1) which account to use unless otherwise specified, (2) how to pay for the item, e.g. with points and/or credit, etc.

The mobile device may be utilized in a real-time interactive transaction between a user and a merchant at the point of sale. When a user presents the mobile device to the POS terminal at the merchant, the terminal accesses the memory and/or firmware of the mobile device (e.g. by near field communications (NFC)) and can execute one or more of several types of real-time transactions. The POS terminal may upload into the mobile device memory one or more purchase incentives such as special offers, coupons, and reward points that are based on the current transaction. For example, if a user is purchasing dog food, the POS terminal may upload dog food coupons to the mobile device. These coupons may be good for the next visit with the merchant, or they may optionally instantly redeemable if desired. The merchant POS terminal may interact with the mobile device (in particular with the user profile) by utilizing a scoring model to determine a user's relative worth to that merchant. That is, by analyzing profile data, including prior purchase transactions, as well as other user data, the POS terminal can assess a score to the user that will reflect the relative value of that user to the merchant. For example, if most of a user's purchases were of low margin items, then that user would have a lower score than a user that purchase more high margin items, since high margin sales are generally worth more to a merchant. That user may be provided with purchase incentives such as coupons, rebates, points, etc. that are reflective of that user's relative value as indicated by the scoring model. This incentive system will interact in real time with the user to provide optimal benefits to both the user as well as the merchant based on the parameters set forth in the scoring algorithm.

Users who provide relatively more data to their profile (and allow their profile data to be used by merchants) may be provided with relatively greater rewards by the participating merchants. For example, if a user is willing to share his income data with merchants, those merchants may reward him with more coupons, rebates, reward points, or other incentives, than a user that is unwilling to share his income data. Since a user's income data is valuable to a merchant he is willing to provide a greater incentive to those users that make it available in their profiles on the smart card.

The user may have a credit card, debit card, or stored value card that is linked to their points account in such a way as to permit them to pay for purchases with a merchant by using the card, wherein the merchant uses the existing credit card payment infrastructure as if payment were being made/authorized by a bank linked to the credit card or debit card account, but in fact the card may be linked to the user's points account. In this manner, the user and merchant can use the points account to pay for purchases in a seamless manner whereby points are used for consideration rather than or as a supplement to cash and traditional credit.

Figure 2A:
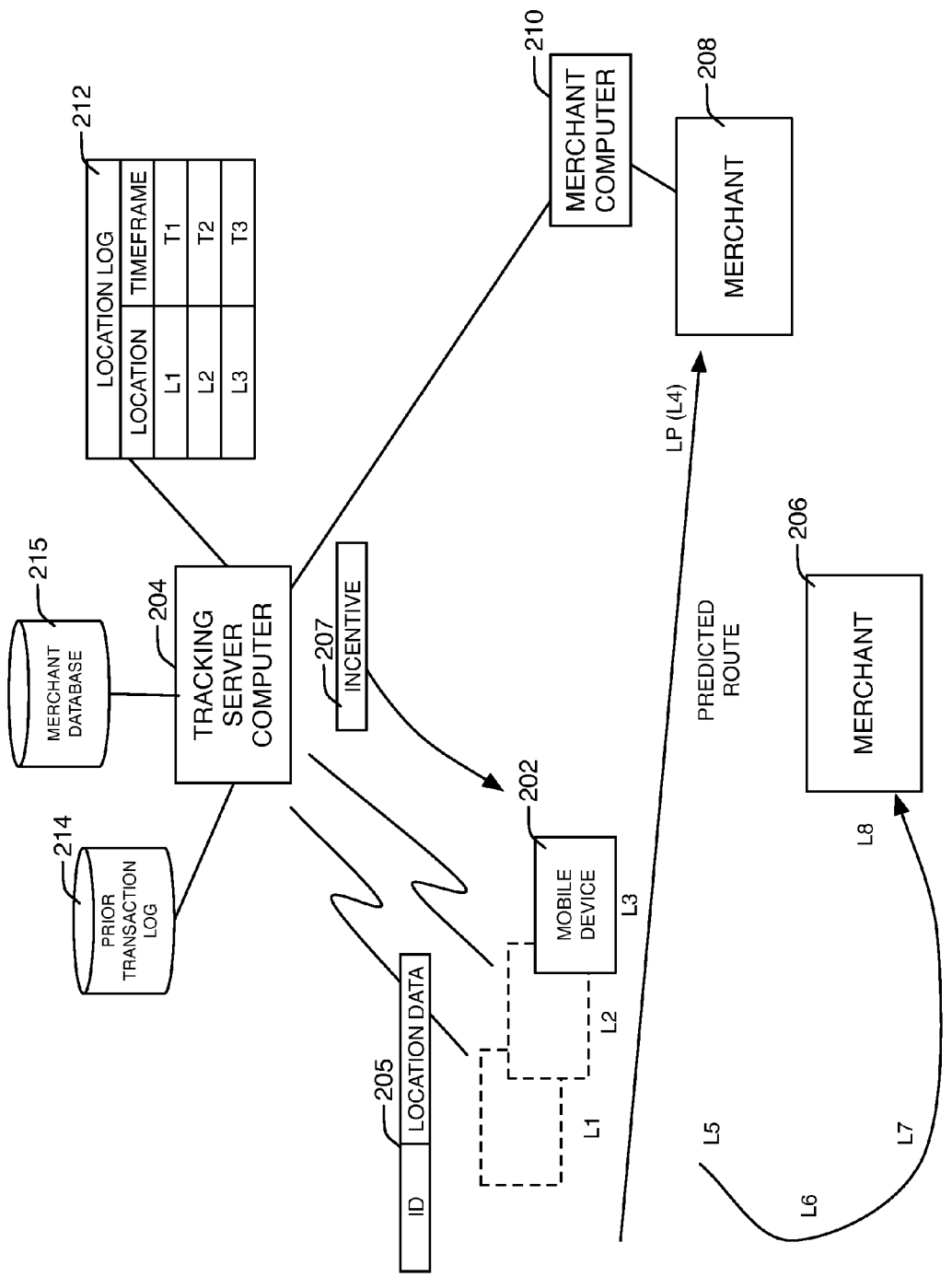
FIG. 2a is a block diagram of the major components of a first embodiment of the present invention.

In addition to using the RFID tracking described above, other location aware technologies may be implemented in various ways by the present invention as will now be described. In the following embodiments, the mobile device is preferably a smartphone that has GPS capabilities as well as wireless data communications, input/output devices, processing, and memory. In a first embodiment, reference is made to the block diagram of FIG. 2a. This embodiment is a method and system for providing a purchase incentive to a user's mobile device based on several parameters including but not limited to the user's location, predicted route of travel, and prior transaction history. FIG. 2a shows a tracking server computer 204, which is in wireless communications with a mobile device 202. For example, the mobile device may be a smartphone such as an IPHONE or ANDROID based phone. The mobile device may also for example be a smart card, a handheld computing device, or a tablet computer. Mobile devices such as smartphones and tablets have wireless data communications circuitry that enables them to communicate with server computers on the Internet as well known in the art.

Figure 7:
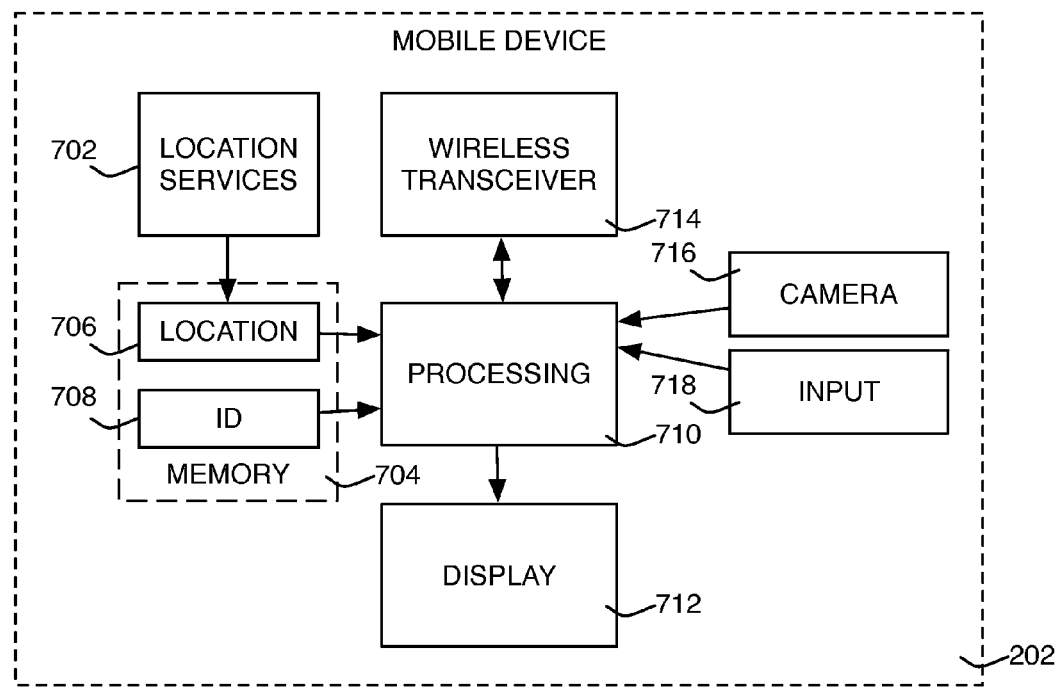
FIG. 7 is a detailed block diagram of the mobile device used in the present invention.

With reference to FIG. 7, the mobile device 202 has a memory 704 for storing a user and/or device identification 708 identifying the device and/or an associated user, as well as location data 706. The location data 706 may be provided by location services 702, which typically would be a GPS receiver that functions to provide GPS coordinate data (latitude, longitude) of the mobile device 202 as well known in the art. Other types of location services may also be used instead of GPS, such as cell phone triangulation. A cell phone's location may be triangulated by communicating with several cell phone towers whose location is known, and then calculating an approximate location of the cell phone mobile device for use as location data 706. In the alternative, location services may be attained based on wi-fi hotspot location data, where the mobile device communicates via wi-fi with hot spots whose location is known, in a manner similar to cell phone tower triangulation. All of these location service techniques and methodologies are well known in the art and need not be further described herein.

Figure 2B:
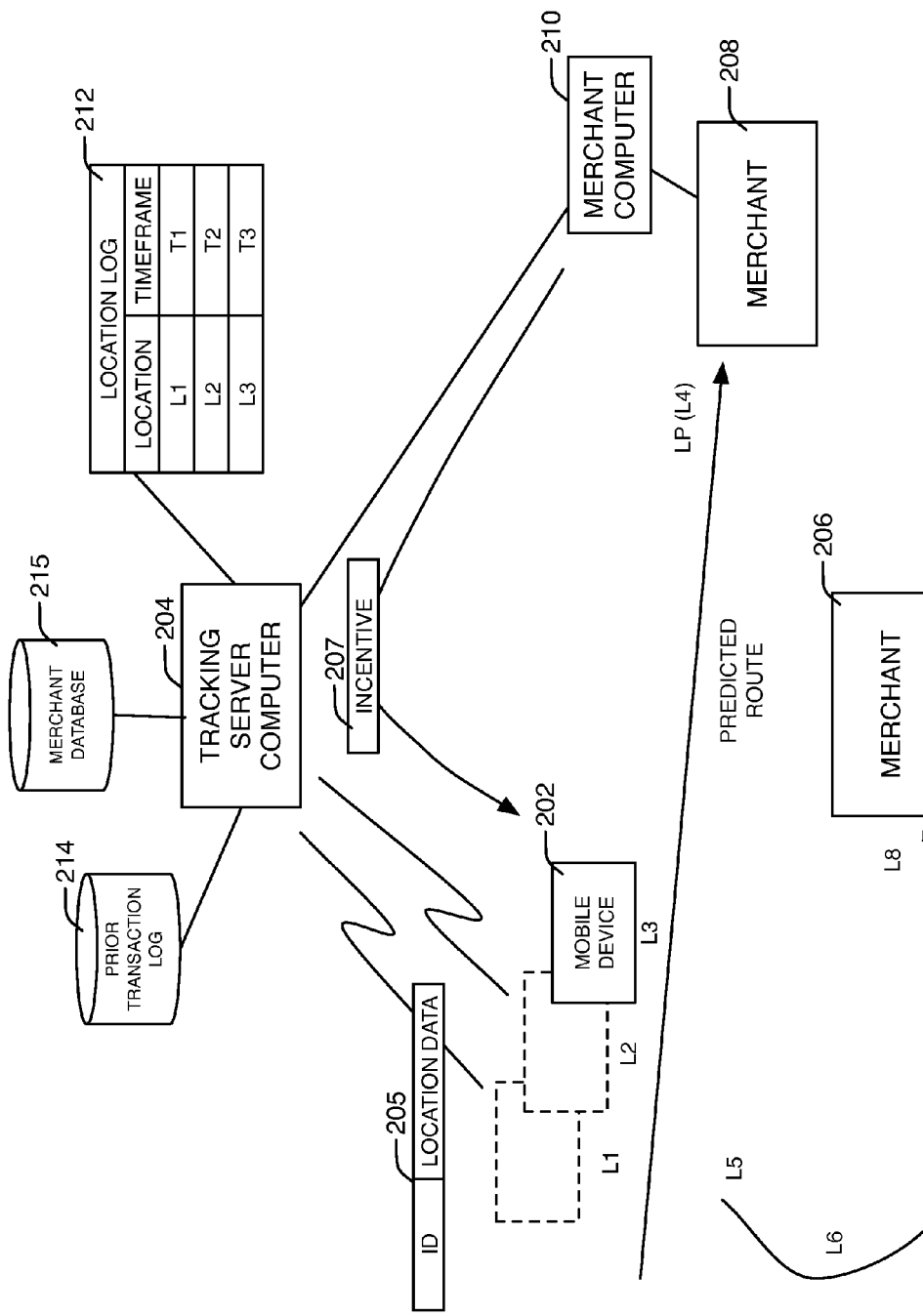
FIG. 2b is a block diagram of the major components of a second embodiment of the present invention.
Figure 2C:
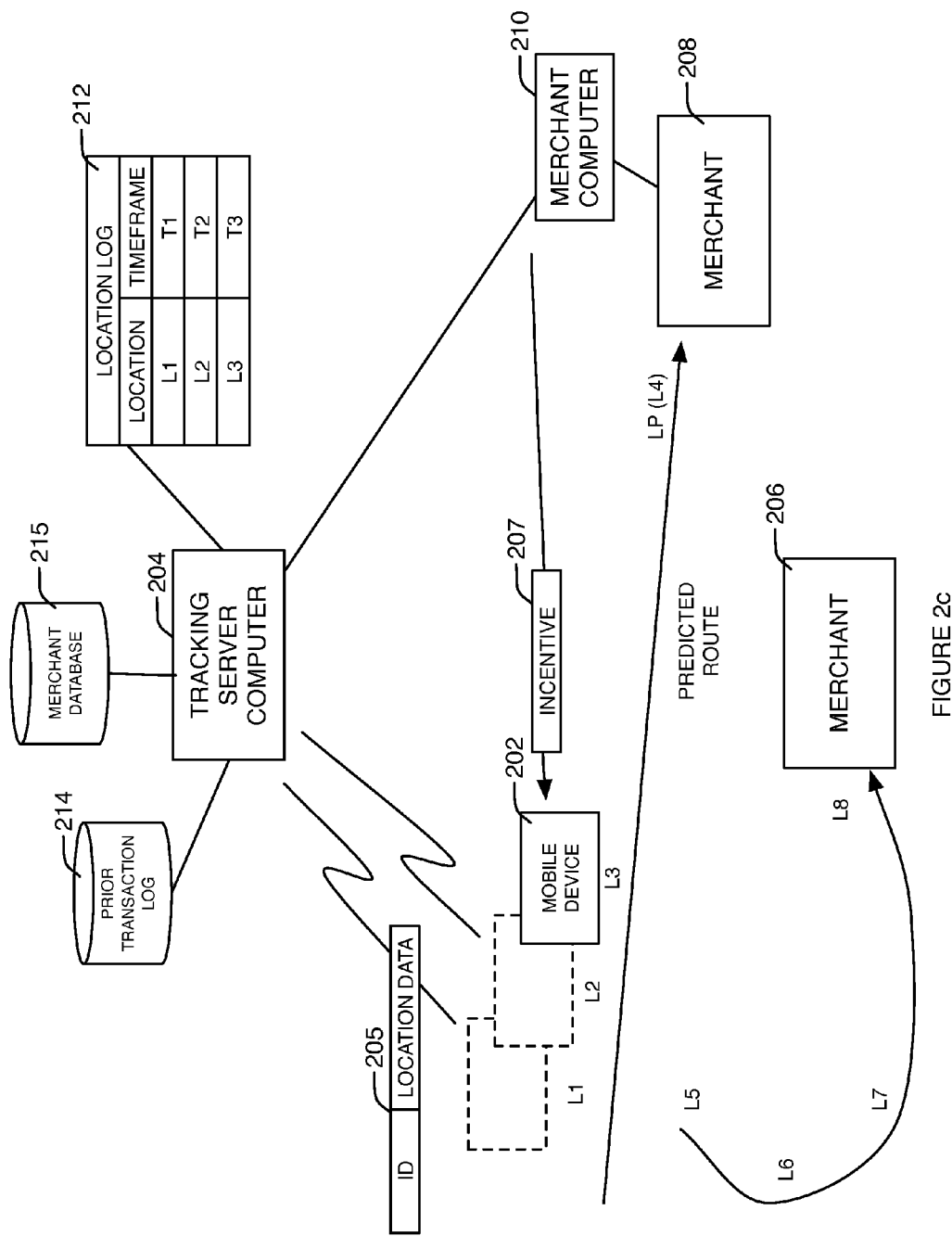
FIG. 2c is a block diagram of the major components of a third embodiment of the present invention.

The mobile device 202 also has a wireless transceiver 714 for transmitting the user and/or device identification 708 and location data 706 in data message and receiving a purchase incentive as shown in FIGS. 2a, 2b and 2c. The wireless transceiver may perform other communications functions as well, such as when the mobile device 202 is a smartphone such as an IPHONE. Also shown in FIG. 7 is processing circuitry 710 for controlling the functionality of the mobile device 202 described herein, and an input device(s) 718 for enabling the user to input data, select functions, etc. as well known in the art. The input device(s) may be hard buttons such as pushbuttons that are dedicated or programmable to select certain functions of the mobile device. Also shown is a display 712 for displaying the purchase incentive 207 as will be described further herein. As known in the art, the display 712 may be a touch screen display that incorporates input functionality as well. A camera 716 may also be provided that would enable to user to capture an image for input purposes if desired.

The tracking server computer 204 is also in communications with the Internet (or other data network(s)) and adapted for communication with the mobile device 202 as well known in the art.

Also shown in FIG. 2a are merchant 206 and merchant 208, although many more merchants are contemplated by this invention. Each of the merchants has an associated merchant computer 210, which may be a simple POS terminal and/or a dedicated server computer adapted to perform the functions of this invention as well as other functions. The merchant computer 210 is also adapted to communicate over a data network (not shown) such as the Internet with the tracking server computer 204.

The tracking server computer 204 has stored in disk storage or otherwise a location log 212 and a prior transaction log 214 as shown in FIG. 2a. The functions of these logs will be described further herein. As an alternative embodiment, the prior transaction log 214 and location log 212 may also be stored in association with the merchant computer 210 and/or the mobile device 202.

Figure 3:
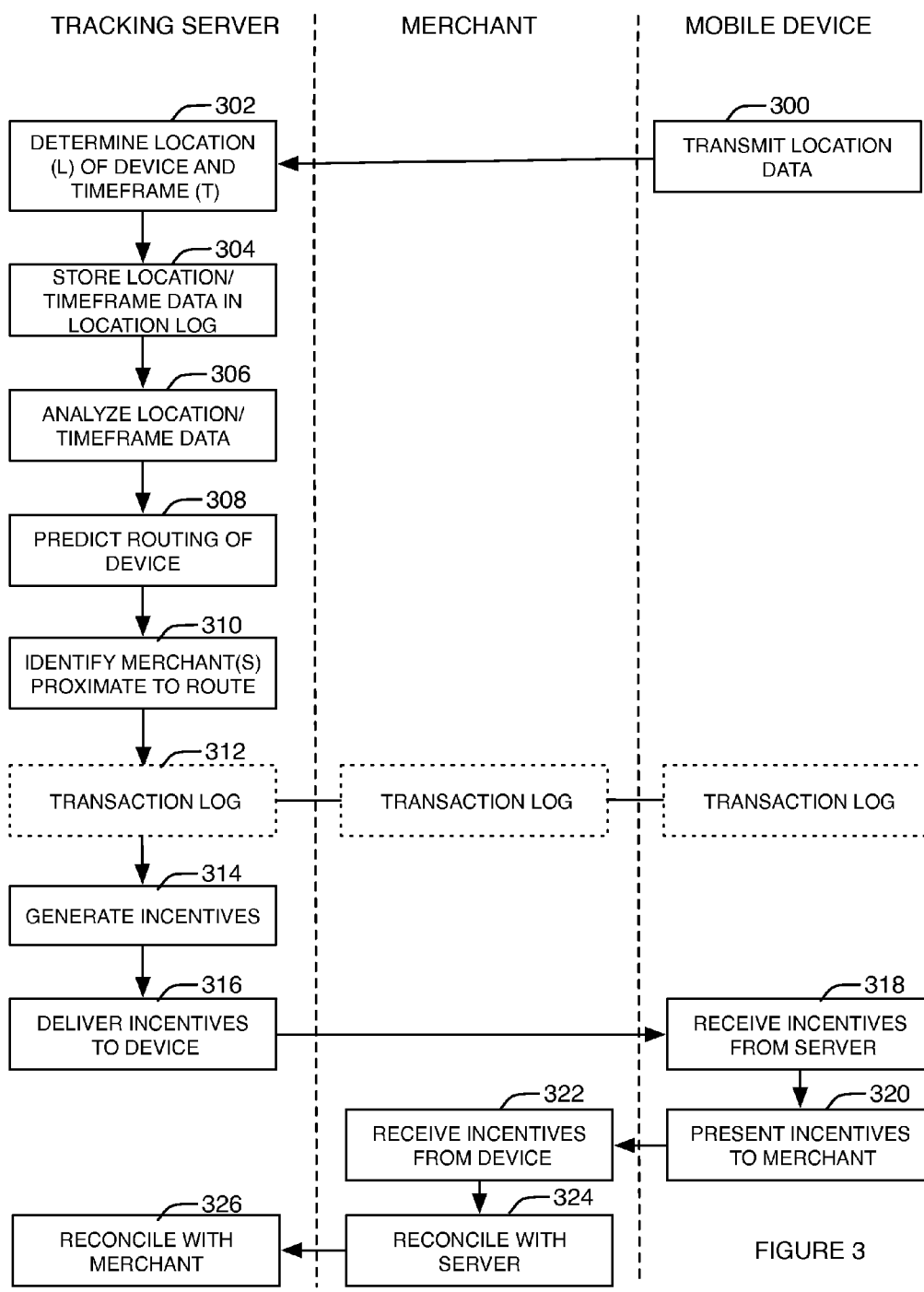
FIG. 3 is a flowchart of the operation of the first embodiment of the present invention.

In the first embodiment, described with reference to the flowchart of FIG. 3, the mobile device 202 transmits at step 300 a series of location signals 205 that each includes the location data 706 and the user/device identification 708 described above. These location signals may be transmitted based on various parameters such as periodically, for example every minute, 5 minutes, 10 minutes, etc. Or, the location of the mobile device 202 may be monitored internally with the processor 710, and when a change in position greater than a predefined amount is detected then the location signal would be transmitted (for example, the signal may be transmitted whenever the mobile device 202 has traveled 1 mile, or 5 miles, etc.) The location signal transmission parameters may be programmed into the mobile device and may be reconfigurable by the system programmer and/or user as desired.

At step 302, the tracking server computer determines the locations of a mobile device as the mobile device travels along a route and an associated timeframe when the mobile device is at each of the locations. The timeframe may be determined by the tracking server computer when it receives each location signal, or the timeframe may be transmitted by the mobile device with each message. The timeframe may be a duration, such as when the mobile device stays at a location for a period of time (e.g. if the user stops for a cup of coffee at Starbucks for an hour). Or, the timeframe may be a single time if the user is in motion when he passes a certain location (such as if the user is driving). In any event, this timeframe tag is stored with the location data in a location log 212 at step 304.

As shown in FIG. 2a, each record in the location log will indicate the location of the device and the timeframe that the device was at that location (and also the device and/or user ID received with the location signal 205, not shown). As shown in FIG. 2a, mobile device 202 was at location L1 at timeframe T1, and then at location L2 at timeframe T2, and then at location L3 at timeframe T3, etc.

At step 306, the tracking server computer analyzes the location log to generate a predicted route and predict a subsequent location and associated timeframe that the mobile device will be at that location at step 308. This may occur after the tracking server computer receives a certain number of location signals 205 in a given time period, or it may occur periodically (e.g. every hour), or it may occur a predefined time after the first location signals is received, or any other way established by the system designer. The analysis of the location log data performed by the tracking server computer enables it to predict a subsequent location where the user/device is going (location predicted, or LP in FIG. 2a) and when the user/device will arrive at that location LP. The tracking server computer may implement a sequence and pattern recognition algorithm in which patterns of behavior of the user are recognized and extrapolated. In addition, the tracking server computer may analyze a frequency of the locations occurring in the location log. That is, the location log may indicate that this user has in the past visited locations L1, L2, and L3 in succession, and then usually will go to location L4 afterwards. L1 may be a bagel shop, L2 may be a dry cleaners, L3 may be a gas station, and L4 may be a shopping mall. This may be the usual route of this user on many Saturday mornings, so when that user again visits L1, L2 and L3 at about the same time intervals, then the tracking server computer predicts that L4 is the likely predicted subsequent location LP.

The tracking server computer may use external data sources in order to predict the estimated time of arrival of the user at the predicted subsequent location LP. For example, the location log may indicate that this user always arrives at L4 one hour after he leaves L3 on a Saturday morning. However, in this case, there is a heavy traffic pattern along the predicted route from L3 to L4, so the tracking server computer will modify the predicted time of arrival accordingly (e.g. from 1 to 2 hours).

Other ways to predict the route of the mobile device may also be used with this invention. For example, the pattern of the locations stored in the location log may be analyzed over time to predict a geometrical progression. As shown in FIG. 2a, the locations L1, L2 and L3 all provide a linear progression, so the tracking server computer extrapolates the next stop at L4 along the same linear progression. In an alternative scenario, the mobile device is logged as being at locations L5, L6 and L7. In this case, this geometrical progression suggests that the next stop on the user's route would be at L8 rather than L4.

The tracking server computer may also ascertain if the user is traveling on a certain roadway as indicated by the locations in the log 212, and with reference to a mapping database as well known in the art. This information may also be used to predict the likely subsequent location of the user.

At step 310, the tracking server computer determines a merchant proximate to the predicted subsequent location of the mobile device. This may be done with reference to a merchant database 215 that indicates, for each participating merchant, the location of that merchant such as its GPS coordinates. This merchant database 215 may be stored at the tracking server computer or stored externally and referenced by the tracking server computer when necessary. The tracking server computer can compare the predicted subsequent location to the database of participating merchant locations and determine which merchants are proximate to the predicted subsequent location of the mobile device (e.g. within 0.1 mile. 0.5 mile, etc). As shown in FIG. 2a, merchant 208 has been determined to be proximate to the predicted subsequent location LP of the mobile device 202.

At step 314, the tracking server computer generates a purchase incentive 207 for use at merchant 208, since that merchant 208 has been determined to be proximate to the predicted subsequent location of the mobile device.

Generation of the purchase incentive may occur on the occurrence of a triggering event. There are two main types of triggering events that may be used to initiate generation of the purchase incentive. In one type, referred to as a push embodiment, the triggering event is automated and based on a predetermined condition. This predetermined condition is set by the system designer, and may be for example when there are a certain number of location records received and stored in the location log, or at the time that the mobile device is within a predetermined distance of the predicted subsequent location (e.g. one mile away), etc. The parameters may be set differently for different merchants, so that a first merchant specifies that its purchase incentives should be generated when the mobile device is one mile away, but a second merchant specifies that its purchase incentives should be generated when the mobile device is three miles away, etc.

Other conditions may be used to automatically trigger the purchase incentive generation as desired. In one embodiment, a user may set the conditions in a program interface on the mobile device or through a web page interface. The conditions may include the type of purchase incentive (e.g. send food coupons immediately, hold coupons for household items until distance to merchant is less than one mile), value of purchase incentive (e.g. send $10 coupons immediately, hold lesser value coupons until within 2 miles of merchant), time of redemption, identification of merchant, etc.

In a second type, referred to as a pull embodiment, the purchase incentives are not generated unless and until a user requests it from the mobile device. In this case, the user would press an input on the mobile device, which would cause an incentive request signal to be sent from the mobile device to the tracking server computer. On receipt of this user request, the tracking server computer would then generate (and deliver) the purchase incentive.

These embodiments may be combined, so that a purchase incentive is generated (and delivered) to the user on the occurrence of a predefined condition (push) as well as when a user request is made (pull).

It is also noted that the triggering events described above may be used in conjunction with other steps in the process, for example the delivery of the incentive to the mobile device. In this case, the incentives would be automatically generated but not delivered until the trigger condition is satisfied.

At step 316, the tracking server computer delivers the purchase incentive 207 to the mobile device 202. This would be done with a wireless data transmission to the mobile device 202, which would receive the purchase incentive in the form of a file at step 318 and store it in the memory 704 and optionally display it on the mobile device display 712. A notification may also be generated, which may be visual (display of the incentive or a message indicating the receipt of the incentive), audible (a tone may be generated), and/or tactile (the device may be caused to vibrate).

The purchase incentive may be for example a discount or other type of coupon, rebate, offer of reward points, etc. The purchase incentive may be made effective only for a time period associated with the predicted time that the mobile device will be at the predicted location. For example, the incentive may be a $10 discount coupon effective only between 11 AM and 1 PM when it is predicted that the user will arrive at the predicted location at 11 AM. The parameters of the purchase incentive 207 may be predetermined by the merchant 208 and stored at the tracking server computer (for example at the merchant database 215). The incentive parameters may be based on any factors established by the merchant such as "give all users a 15% discount on Saturdays", or "give all repeat users a $20 coupon for electronics on Friday nights", etc.

The user may then present at step 320 the received incentive to the merchant 208 to redeem it as part of a purchase transaction at that merchant 208, and at step 322 the merchant 208 receives the incentive 207 from the user's device. This may be accomplished in various ways. For example, the incentive may be transferred from the mobile device 202 to the merchant computer (e.g. a POS terminal) via near field communications (NFC) technology. Or, a bar code such as a QR code may be generated as part of the purchase incentive 207, which could be scanned at the POS terminal and decoded to obtain the purchase incentive parameters such as discount amount, expiration time etc. Or, the incentive 207 may simply be displayed on the mobile device and read by a clerk at the merchant 208 to be applied to the purchase. At some point after (or even during) the purchase transaction is executed, the merchant at steps 324 and 326 will reconcile the purchase incentive with the tracking server computer 204.

In a variation of this first embodiment, the tracking server computer may at step 312 analyze a prior transaction log 214 associated with the mobile device 202, which includes records of prior transactions executed by the mobile device 202. In a simple case, the prior transactions may be stored as a result of the merchant reconciliation process described above. In this case, each time a purchase incentive is delivered by the tracking server computer to the mobile device 202, a record is made in the prior transaction log, and each time that purchase incentive 207 is redeemed with a merchant, a record is made in the prior transaction log. Or, prior transactions may include purchases made by user as may be obtained from various external sources such as credit card transactions, etc. The prior transaction log is preferably stored at the tracking server computer 204, but it may also be stored on the mobile device 202 and/or a merchant computer 210. Alternatively, the prior transaction log may be stored on an external third party server computer and accessed as needed.

In this variation, the tracking server computer 204 generates the purchase incentive at step 314 based also on the prior transaction log 214. For example, the merchant 208 may establish that all users who have made twenty or more purchases at that merchant be given a greater discount than those users who have made less than twenty purchases at that merchant. In another example, the purchase incentive is based on a type of prior transactions executed by the mobile device, or, the purchase incentive is based on a value of prior transactions executed by the mobile device. In another example, the tracking server computer may generate a purchase incentive for use with a merchant associated with the prior transaction log, or for use with a merchant not associated with the prior transaction log.

In a second embodiment, a merchant computer generates the purchase incentive (rather than the tracking server computer) and provides the purchase incentive back to the tracking server computer which then delivers it to the mobile device. Reference is made to the block diagram of FIG. 2b and the flowchart of FIG. 4. FIG. 2b shows a tracking server computer 204, which is in wireless communications with a mobile device 202, the details of which are described above. Also shown in FIG. 2b are merchant 206 and merchant 208, although many more merchants are contemplated by this invention. Each of the merchants has an associated merchant computer 210, which may be a simple POS terminal and/or a dedicated server computer adapted to perform the functions of this invention as well as other functions. The merchant computer 210 is also adapted to communicate over a data network (not shown) such as the Internet with the tracking server computer 204.

The tracking server computer 204 has stored in disk storage or otherwise a location log 212 and a prior transaction log 214 as shown in FIG. 2b. The functions of these logs is described further above. As an alternative embodiment, the prior transaction log 214 and location log 212 may also be stored in association with the merchant computer 210 and/or the mobile device 202.

Figure 4:
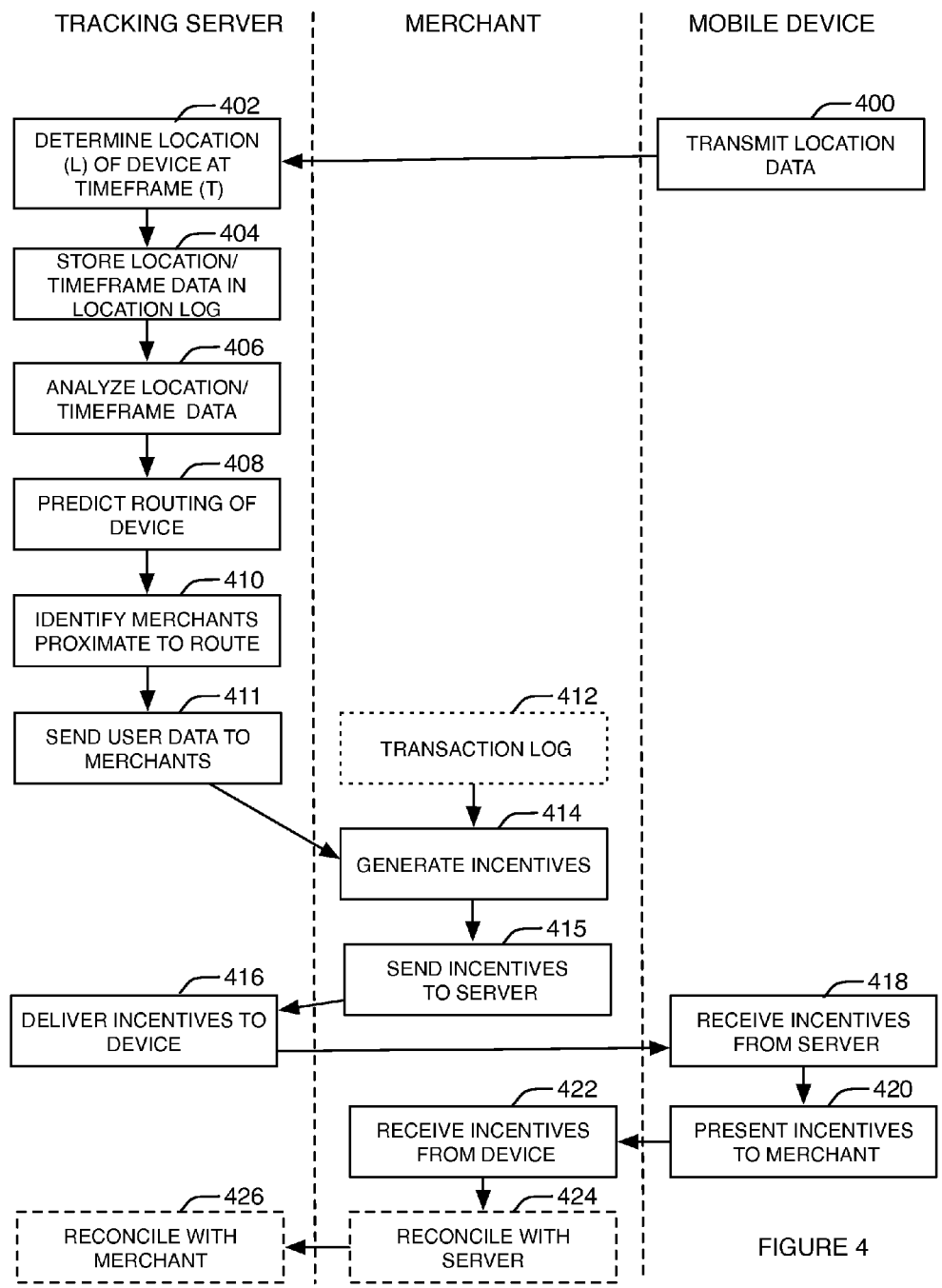
FIG. 4 is a flowchart of the operation of the second embodiment of the present invention.

Referring to the flowchart of FIG. 4, the mobile device 202 transmits at step 400 a series of location signals 205 that each includes the location data 706 and the user/device identification 708 described above. These location signals may be transmitted based on various parameters such as periodically, for example every minute, 5 minutes, 10 minutes, etc. Or, the location of the mobile device 202 may be monitored internally with the processor 710, and when a change in position greater than a predefined amount is detected then the location signal would be transmitted (for example, the signal may be transmitted whenever the mobile device 202 has traveled 1 mile, or 5 miles, etc.) The location signal transmission parameters may be programmed into the mobile device and may be reconfigurable by the system programmer and/or user as desired.

At step 402, the tracking server computer determines the locations of a mobile device as the mobile device travels along a route and an associated timeframe when the mobile device is at each of the locations. The timeframe may be determined by the tracking server computer when it receives each location signals, or the timeframe may be transmitted by the mobile device with each message. The timeframe may be a duration, such as when the mobile device stays at a location for a period of time (e.g. if the user stops for a cup of coffee at Starbucks for an hour). Or, the timeframe may be a single time if the user is in motion when he passes a certain location (such as if the user is driving). In any event, this timeframe tag is stored with the location data in a location log 212 at step 404. As shown in FIG. 2b, each record in the location log will indicate the location of the device and the timeframe that the device was at that location (and also the device and/or user ID received with the location signal 205, not shown). As shown in FIG. 2b, mobile device 202 was at location L1 at timeframe T1, and then at location L2 at timeframe T2, and then at location L3 at timeframe T3, etc.

At step 406, the tracking server computer analyzes the location log to generate a predicted route and predict a subsequent location and associated timeframe that the mobile device will be at that location at step 408. This may occur after the tracking server computer receives a certain number of location signals 205 in a given time period, or it may occur periodically (e.g. every hour), or it may occur a predefined time after the first location signals is received, or any other way established by the system designer. The analysis of the location log data performed by the tracking server computer enables it to predict a subsequent location where the user/device is going (location predicted, or LP in FIG. 2b) and when the user/device will arrive at that location LP. The tracking server computer may implement a sequence and pattern recognition algorithm in which patterns of behavior of the user are recognized and extrapolated. In addition, the tracking server computer may analyze a frequency of the locations occurring in the location log. That is, the location log may indicate that this user has in the past visited locations L1, L2, and L3 in succession, and then usually will go to location L4 afterwards. L1 may be a bagel shop, L2 may be a dry cleaners, L3 may be a gas station, and L4 may be a shopping mall. This may be the usual route of this user on many Saturday mornings, so when that user again visits L1, L2 and L3 at about the same time intervals, then the tracking server computer predicts that L4 is the likely predicted subsequent location LP.

The tracking server computer may use external data sources in order to predict the estimated time of arrival of the user at the predicted subsequent location LP. For example, the location log may indicate that this user always arrives at L4 one hour after he leaves L3 on a Saturday morning. However, in this case, there is a heavy traffic pattern along the predicted route from L3 to L4, so the tracking server computer will modify the predicted time of arrival accordingly (e.g. from 1 to 2 hours).

Other ways to predict the route of the mobile device may also be used with this invention. For example, the pattern of the locations stored in the location log may be analyzed over time to predict a geometrical progression. As shown in FIG. 2b, the locations L1, L2 and L3 all provide a linear progression, so the tracking server computer extrapolates the next stop at L4 along the same linear progression. In an alternative scenario, the mobile device is logged as being at locations L5, L6 and L7. In this case, this geometrical progression suggests that the next stop on the user's route would be at L8 rather than L4.

The tracking server computer may also ascertain if the user is traveling on a certain roadway as indicated by the locations in the log 212, and with reference to a mapping database as well known in the art. This information may also be used to predict the likely subsequent location of the user.

At step 410, the tracking server computer determines a merchant proximate to the predicted subsequent location of the mobile device. This may be done with reference to a merchant database 215 that indicates, for each participating merchant, the location of that merchant such as its GPS coordinates. This merchant database may be stored at the tracking server computer or externally and referenced by the tracking server computer when necessary. The tracking server computer can compare the predicted subsequent location to the database of participating merchant locations and determine which merchants are proximate to the predicted subsequent location of the mobile device (e.g. within 0.1 mile. 0.5 mile, etc). As shown in FIG. 2b, merchant 208 has been determined to be proximate to the predicted subsequent location LP of the mobile device 202.

At step 411, the tracking server computer 204 informs the merchant computer 210 that the mobile device 202 is predicted to be near that merchant 208 at the predicted time. The tracking server computer 204 may also provide user data to the merchant computer 210 (such as from a prior transaction log at step 412 as described below) to assist in generating the purchase incentive. At step 414, the merchant computer 210 generates a purchase incentive 207 for use at merchant 208, since that merchant 208 has been determined to be proximate to the predicted subsequent location of the mobile device 202.

Generation of the purchase incentive may occur on the occurrence of a triggering event. There are two main types of triggering events that may be used to initiate generation of the purchase incentive. In one type, referred to as a push embodiment, the triggering event is automated and based on a predetermined condition. This predetermined condition is set by the system designer, and may be for example when there are a certain number of location records received and stored in the location log, or at the time that the mobile device is within a predetermined distance of the predicted subsequent location (e.g. one mile away), etc. In a second type, referred to as a pull embodiment, the purchase incentives are not generated unless and until a user requests it from the mobile device. In this case, the user would press an input on the mobile device, which would cause an incentive request signal to be sent from the mobile device to the tracking server computer. On receipt of this user request, the tracking server computer would then cause the merchant computer to generate (and deliver) the purchase incentive. These triggering events and conditions are discussed in more detail with respect to the first embodiment above.

At step 415, the merchant computer 210 sends the purchase incentive 207 to the tracking server computer 204, and at step 416 the tracking server computer 204 delivers the purchase incentive 207 to the mobile device 202. This would be done with a wireless data transmission to the mobile device 202, which would receive the purchase incentive in the form of a file at step 418 and store it in the memory 704 and optionally display it on the mobile device display 712. A notification may also be generated, which may be visual (display of the incentive or a message indicating the receipt of the incentive), audible (a tone may be generated), and/or tactile (the device may be caused to vibrate).

The purchase incentive may be for example a discount or other type of coupon, rebate, offer of reward points, etc. The purchase incentive may be made effective only for a time period associated with the predicted time that the mobile device will be at the predicted location. For example, the incentive may be a $10 discount coupon effective only between 11 AM and 1 PM when it is predicted that the user will arrive at the predicted location at 11 AM. The parameters of the purchase incentive 207 may be predetermined by the merchant 208 and stored at the tracking server computer (for example at the merchant database 215). The incentive parameters may be based on any factors established by the merchant such as "give all users a 15% discount on Saturdays", or "give all repeat users a $20 coupon for electronics on Friday nights", etc.

The user may then present at step 420 the received incentive to the merchant 208 to redeem it as part of a purchase transaction at that merchant 208, and at step 422 the merchant 208 receives the incentive 207 from the user's device. This may be accomplished in various ways. For example, the incentive may be transferred from the mobile device 202 to the merchant computer (e.g. a POS terminal) via near field communications (NFC) technology. Or, a bar code such as a QR code may be generated as part of the purchase incentive 207, which could be scanned at the POS terminal and decoded to obtain the purchase incentive parameters such as discount amount, expiration time etc. Or, the incentive 207 may simply be displayed on the mobile device and read by a clerk at the merchant 208 to be applied to the purchase. At some point after (or even during) the purchase transaction is executed, the merchant at steps 424 and 426 will reconcile the purchase incentive with the tracking server computer 204.

In a variation of this second embodiment, the merchant computer may at step 412 analyze a prior transaction log 214 associated with the mobile device 202, which includes records of prior transactions executed by the mobile device 202. In a simple case, the prior transactions may be stored as a result of the merchant reconciliation process described above. In this case, each time a purchase incentive is delivered by the tracking server computer to the mobile device 202, a record is made in the prior transaction log, and each time that purchase incentive 207 is redeemed with a merchant, a record is made in the prior transaction log. Or, prior transactions may include purchases made by user as may be obtained from various external sources such as credit card transactions, etc. The prior transaction log is preferably stored at the tracking server computer 204, but it may also be stored on the mobile device 202 and/or a merchant computer 210. Alternatively, the prior transaction log may be stored on an external third party server computer and accessed as needed.

In this variation, the merchant computer 210 generates the purchase incentive at step 414 based also on the prior transaction log 214. For example, the merchant 208 may establish that all users who have made twenty or more purchases at that merchant be given a greater discount than those users who have made less than twenty purchases at that merchant. In another example, the purchase incentive is based on a type of prior transactions executed by the mobile device, or, the purchase incentive is based on a value of prior transactions executed by the mobile device. In another example, the tracking server computer may generate a purchase incentive for use with a merchant associated with the prior transaction log, or for use with a merchant not associated with the prior transaction log.

In a third embodiment of the invention, the merchant computer generates the purchase incentive (rather than the tracking server computer) and delivers the token directly to the mobile device (rather than through the tracking server computer). Reference is made to the block diagram of FIG. 2c and the flowchart of FIG. 5. FIG. 2c shows a tracking server computer 204, which is in wireless communications with a mobile device 202, the details of which are described above. Also shown in FIG. 2c are merchant 206 and merchant 208, although many more merchants are contemplated by this invention. Each of the merchants has an associated merchant computer 210, which may be a simple POS terminal and/or a dedicated server computer adapted to perform the functions of this invention as well as other functions. The merchant computer 210 is also adapted to communicate over a data network (not shown) such as the Internet with the tracking server computer 204.

The tracking server computer 204 has stored in disk storage or otherwise a location log 212 and a prior transaction log 214 as shown in FIG. 2c. The functions of these logs is described further above. As an alternative embodiment, the prior transaction log 214 and location log 212 may also be stored in association with the merchant computer 210 and/or the mobile device 202.

Figure 5:
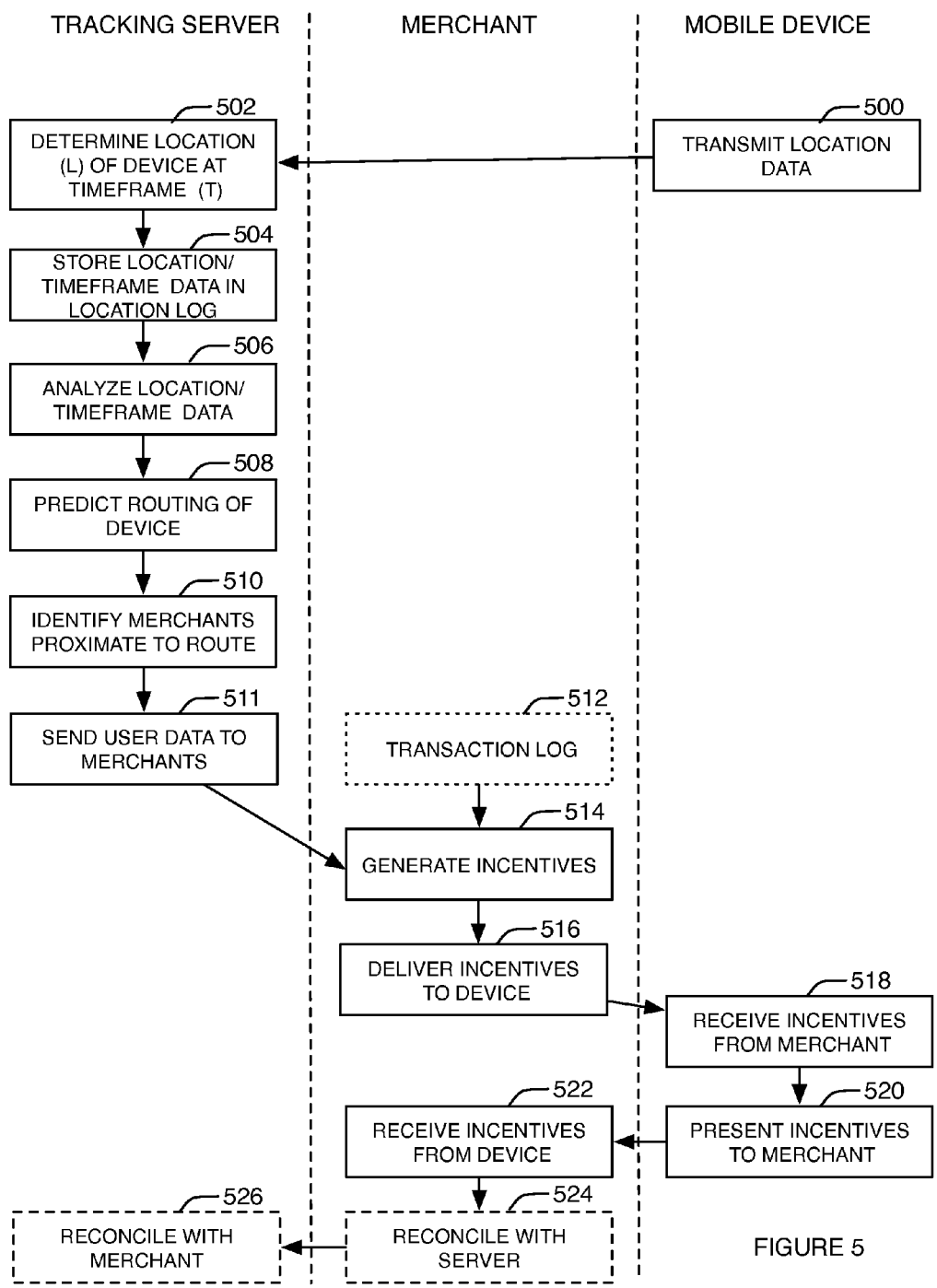
FIG. 5 is a flowchart of the operation of the third embodiment of the present invention.

Referring to the flowchart of FIG. 5, the mobile device 202 transmits at step 500 a series of location signals 205 that each includes the location data 706 and the user/device identification 708 described above. These location signals may be transmitted based on various parameters such as periodically, for example every minute, 5 minutes, 10 minutes, etc. Or, the location of the mobile device 202 may be monitored internally with the processor 710, and when a change in position greater than a predefined amount is detected then the location signal would be transmitted (for example, the signal may be transmitted whenever the mobile device 202 has traveled 1 mile, or 5 miles, etc.) The location signal transmission parameters may be programmed into the mobile device and may be reconfigurable by the system programmer and/or user as desired.

At step 502, the tracking server computer determines the locations of a mobile device as the mobile device travels along a route and an associated timeframe when the mobile device is at each of the locations. The timeframe may be determined by the tracking server computer when it receives each location signals, or the timeframe may be transmitted by the mobile device with each message. The timeframe may be a duration, such as when the mobile device stays at a location for a period of time (e.g. if the user stops for a cup of coffee at Starbucks for an hour). Or, the timeframe may be a single time if the user is in motion when he passes a certain location (such as if the user is driving). In any event, this timeframe tag is stored with the location data in a location log 212 at step 504. As shown in FIG. 2c, each record in the location log will indicate the location of the device and the timeframe that the device was at that location (and also the device and/or user ID received with the location signal 205, not shown). As shown in FIG. 2c, mobile device 202 was at location L1 at timeframe T1, and then at location L2 at timeframe T2, and then at location L3 at timeframe T3, etc.

At step 506, the tracking server computer analyzes the location log to generate a predicted route and predict a subsequent location and associated timeframe that the mobile device will be at that location at step 508. This may occur after the tracking server computer receives a certain number of location signals 205 in a given time period, or it may occur periodically (e.g. every hour), or it may occur a predefined time after the first location signals is received, or any other way established by the system designer. The analysis of the location log data performed by the tracking server computer enables it to predict a subsequent location where the user/device is going (location predicted, or LP in FIG. 2c) and when the user/device will arrive at that location LP. The tracking server computer may implement a sequence and pattern recognition algorithm in which patterns of behavior of the user are recognized and extrapolated. In addition, the tracking server computer may analyze a frequency of the locations occurring in the location log. That is, the location log may indicate that this user has in the past visited locations L1, L2, and L3 in succession, and then usually will go to location L4 afterwards. L1 may be a bagel shop, L2 may be a dry cleaners, L3 may be a gas station, and L4 may be a shopping mall. This may be the usual route of this user on many Saturday mornings, so when that user again visits L1, L2 and L3 at about the same time intervals, then the tracking server computer predicts that L4 is the likely predicted subsequent location LP.

The tracking server computer may use external data sources in order to predict the estimated time of arrival of the user at the predicted subsequent location LP. For example, the location log may indicate that this user always arrives at L4 one hour after he leaves L3 on a Saturday morning. However, in this case, there is a heavy traffic pattern along the predicted route from L3 to L4, so the tracking server computer will modify the predicted time of arrival accordingly (e.g. from 1 to 2 hours). Other ways to predict the route of the mobile device may also be used with this invention. For example, the pattern of the locations stored in the location log may be analyzed over time to predict a geometrical progression. As shown in FIG. 2c, the locations L1, L2 and L3 all provide a linear progression, so the tracking server computer extrapolates the next stop at L4 along the same linear progression. In an alternative scenario, the mobile device is logged as being at locations L5, L6 and L7. In this case, this geometrical progression suggests that the next stop on the user's route would be at L8 rather than L4.

The tracking server computer may also ascertain if the user is traveling on a certain roadway as indicated by the locations in the log 212, and with reference to a mapping database as well known in the art. This information may also be used to predict the likely subsequent location of the user.

At step 510, the tracking server computer determines a merchant proximate to the predicted subsequent location of the mobile device. This may be done with reference to a merchant database 215 that indicates, for each participating merchant, the location of that merchant such as its GPS coordinates. This merchant database may be stored at the tracking server computer or externally and referenced by the tracking server computer when necessary. The tracking server computer can compare the predicted subsequent location to the database of participating merchant locations and determine which merchants are proximate to the predicted subsequent location of the mobile device (e.g. within 0.1 mile. 0.5 mile, etc). As shown in FIG. 2c, merchant 208 has been determined to be proximate to the predicted subsequent location LP of the mobile device 202.

At step 511, the tracking server computer 204 informs the merchant computer 210 that the mobile device 202 is predicted to be near that merchant 208 at the predicted time. The tracking server computer 204 may also provide user data to the merchant computer 210 (such as from a prior transaction log at step 512 as described below) to assist in generating the purchase incentive. At step 514, the merchant computer 210 generates a purchase incentive 207 for use at merchant 208, since that merchant 208 has been determined to be proximate to the predicted subsequent location of the mobile device 202.

Generation of the purchase incentive may occur on the occurrence of a triggering event. There are two main types of triggering events that may be used to initiate generation of the purchase incentive. In one type, referred to as a push embodiment, the triggering event is automated and based on a predetermined condition. This predetermined condition is set by the system designer, and may be for example when there are a certain number of location records received and stored in the location log, or at the time that the mobile device is within a predetermined distance of the predicted subsequent location (e.g. one mile away), etc. In a second type, referred to as a pull embodiment, the purchase incentives are not generated unless and until a user requests it from the mobile device. In this case, the user would press an input on the mobile device, which would cause an incentive request signal to be sent from the mobile device to the tracking server computer. On receipt of this user request, the tracking server computer would then cause the merchant computer to generate (and deliver) the purchase incentive. These triggering events and conditions are discussed in more detail with respect to the first embodiment above.

At step 516, the merchant computer 210 delivers the purchase incentive 207 directly to the mobile device 202. This would be done with a wireless data transmission to the mobile device 202, which would receive the purchase incentive in the form of a file at step 518 and store it in the memory 704 and optionally display it on the mobile device display 712. A notification may also be generated, which may be visual (display of the incentive or a message indicating the receipt of the incentive), audible (a tone may be generated), and/or tactile (the device may be caused to vibrate).

The purchase incentive may be for example a discount or other type of coupon, rebate, offer of reward points, etc. The purchase incentive may be made effective only for a time period associated with the predicted time that the mobile device will be at the predicted location. For example, the incentive may be a $10 discount coupon effective only between 11 AM and 1 PM when it is predicted that the user will arrive at the predicted location at 11 AM. The parameters of the purchase incentive 207 may be predetermined by the merchant 208 and stored at the merchant computer 210. The incentive parameters may be based on any factors established by the merchant such as "give all users a 15% discount on Saturdays", or "give all repeat users a $20 coupon for electronics on Friday nights", etc.

The user may then present at step 520 the received incentive to the merchant 208 to redeem it as part of a purchase transaction at that merchant 208, and at step 522 the merchant 208 receives the incentive 207 from the user's device. This may be accomplished in various ways. For example, the incentive may be transferred from the mobile device 202 to the merchant computer (e.g. a POS terminal) via near field communications (NFC) technology. Or, a bar code such as a QR code may be generated as part of the purchase incentive 207, which could be scanned at the POS terminal and decoded to obtain the purchase incentive parameters such as discount amount, expiration time etc. Or, the incentive 207 may simply be displayed on the mobile device and read by a clerk at the merchant 208 to be applied to the purchase. At some point after (or even during) the purchase transaction is executed, the merchant at steps 524 and 526 will reconcile the purchase incentive with the tracking server computer 204.

In a variation of this third embodiment, the merchant computer may at step 512 analyze a prior transaction log 214 associated with the mobile device 202, which includes records of prior transactions executed by the mobile device 202. In a simple case, the prior transactions may be stored as a result of the merchant reconciliation process described above. In this case, each time a purchase incentive is delivered by the tracking server computer to the mobile device 202, a record is made in the prior transaction log, and each time that purchase incentive 207 is redeemed with a merchant, a record is made in the prior transaction log. Or, prior transactions may include purchases made by user as may be obtained from various external sources such as credit card transactions, etc. The prior transaction log is preferably stored at the tracking server computer 204, but it may also be stored on the mobile device 202 and/or a merchant computer 210. Alternatively, the prior transaction log may be stored on an external third party server computer and accessed as needed.

In this variation, the merchant computer 210 generates the purchase incentive at step 514 based also on the prior transaction log 214. For example, the merchant 208 may establish that all users who have made twenty or more purchases at that merchant be given a greater discount than those users who have made less than twenty purchases at that merchant. In another example, the purchase incentive is based on a type of prior transactions executed by the mobile device, or, the purchase incentive is based on a value of prior transactions executed by the mobile device. In another example, the tracking server computer may generate a purchase incentive for use with a merchant associated with the prior transaction log, or for use with a merchant not associated with the prior transaction log.

Figure 2D:
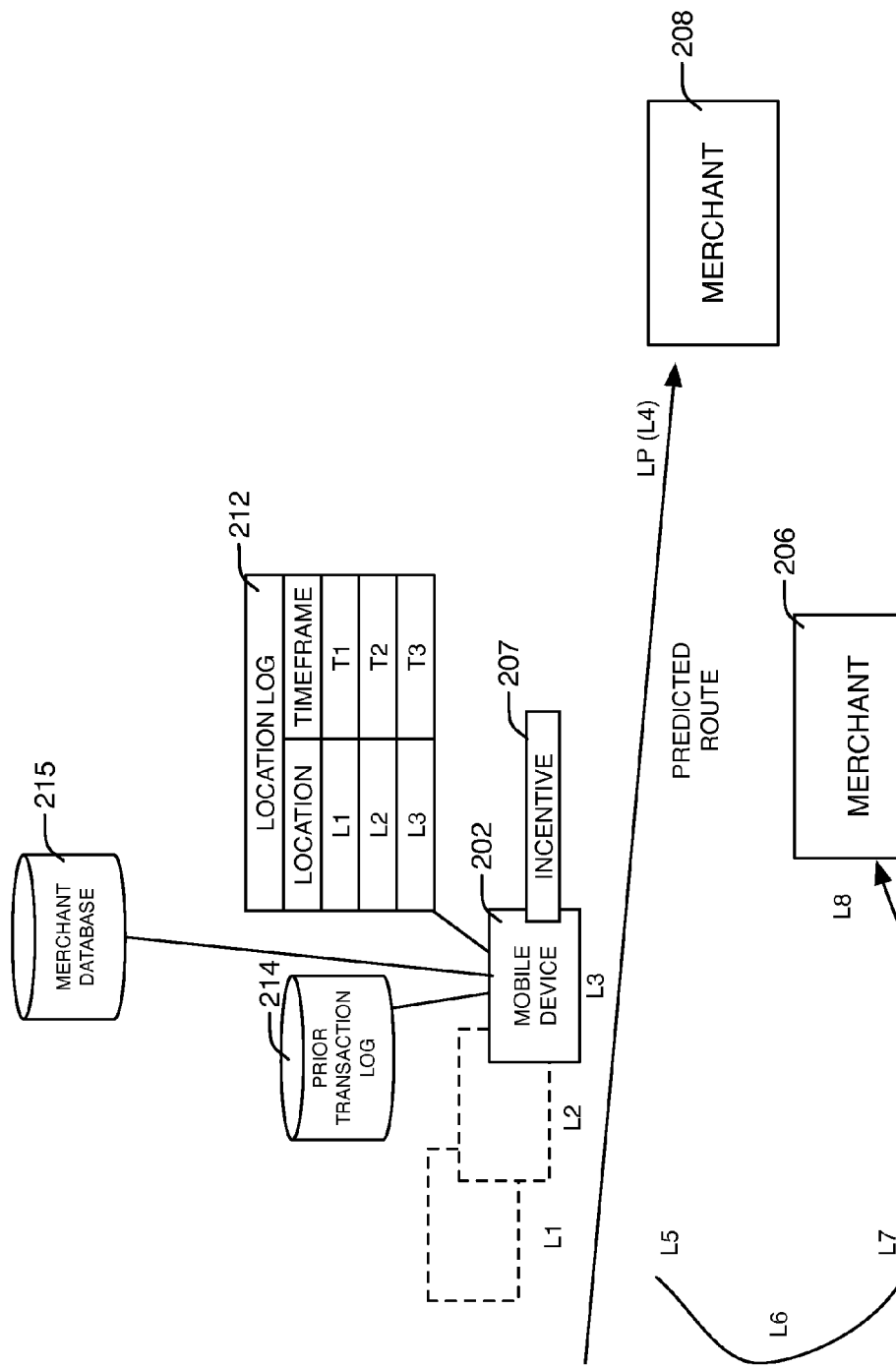
FIG. 2d is a block diagram of the major components of a fourth embodiment of the present invention.

In a fourth embodiment of the invention, the use of a tracking server computer is not required, and all functionality occurs within the mobile device. Reference is made to the block diagram of FIG. 2d and the flowchart of FIG. 6. FIG. 2d shows the mobile device 202, and merchants 206, 208, although many more merchants are contemplated by this invention. Each of the merchants has an associated merchant computer 210, which may be a simple POS terminal and/or a dedicated server computer adapted to perform the functions of this invention as well as other functions.

The mobile device 202 has stored in memory 704 a location log 212 and a prior transaction log 214 as shown in FIG. 2d. The functions of these logs is described further above. As an alternative embodiment, the prior transaction log 214 and location log 212 may also be stored in association with the merchant computer 210.

Figure 6:
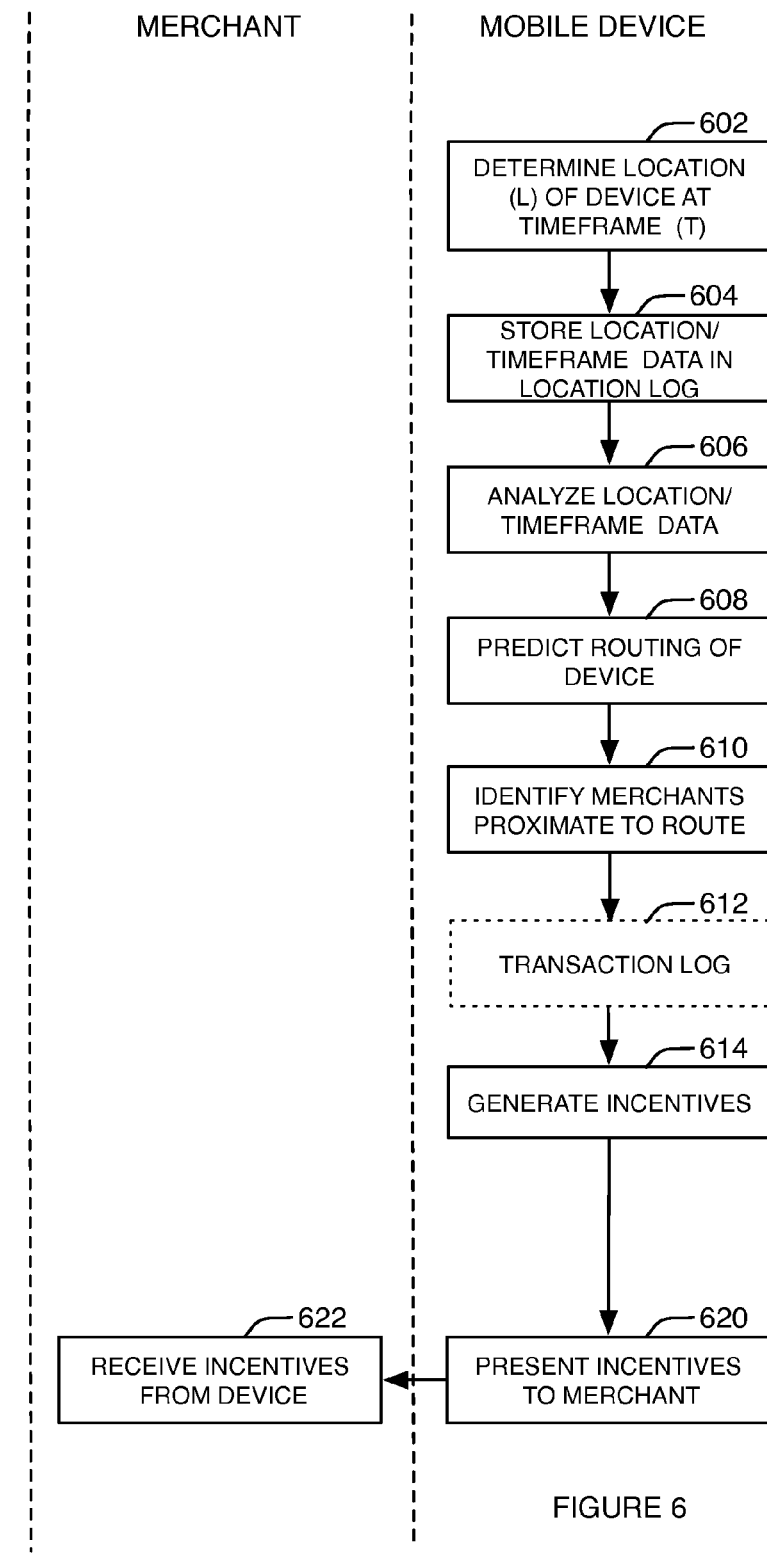
FIG. 6 is a flowchart of the operation of the fourth embodiment of the present invention.

Referring to the flowchart of FIG. 6, at steps 602 and 604 the mobile device 202 generates and stores a series of records in the location log 212 that each includes location data 706 and an associated timeframe when the mobile device is at each of the locations. The timeframe may be a duration, such as when the mobile device stays at a location for a period of time (e.g. if the user stops for a cup of coffee at Starbucks for an hour). Or, the timeframe may be a single time if the user is in motion when he passes a certain location (such as if the user is driving). These location records may be determined based on various parameters such as periodically, for example every minute, 5 minutes, 10 minutes, etc. Or, the location of the mobile device 202 may be monitored internally with the processor 710, and when a change in position greater than a predefined amount is detected then the location record would be recorded (for example, the signal may be transmitted whenever the mobile device 202 has travelled 1 mile, or 5 miles, etc.). The location record storage parameters may be programmed into the mobile device and may be reconfigurable by the system programmer and/or user as desired.

As shown in FIG. 2d, each record in the location log will indicate the location of the device and the timeframe that the device was at that location. As shown in FIG. 2d, mobile device 202 was at location L1 at timeframe T1, and then at location L2 at timeframe T2, and then at location L3 at timeframe T3, etc.

At step 606, the mobile device 202 analyzes the location log 212 to generate a predicted route and predict a subsequent location and associated timeframe that the mobile device will be at that location at step 608. This may occur after the mobile device records a certain number of location records in a given time period, or it may occur periodically (e.g. every hour), or it may occur a predefined time after the first location record is stored, or any other way established by the system designer. The analysis of the location log data performed by the mobile device enables it to predict a subsequent location where the user/device is going (location predicted, or LP in FIG. 2d) and when the user/device will arrive at that location LP. The mobile device may implement a sequence and pattern recognition algorithm in which patterns of behavior of the user are recognized and extrapolated. In addition, the mobile device may analyze a frequency of the locations occurring in the location log. That is, the location log may indicate that this user has in the past visited locations L1, L2, and L3 in succession, and then usually will go to location L4 afterwards. L1 may be a bagel shop, L2 may be a dry cleaners, L3 may be a gas station, and L4 may be a shopping mall. This may be the usual route of this user on many Saturday mornings, so when that user again visits L1, L2 and L3 at about the same time intervals, then the mobile device predicts that L4 is the likely predicted subsequent location LP.

The mobile device may use external data sources in order to predict the estimated time of arrival of the user at the predicted subsequent location LP. For example, the location log may indicate that this user always arrives at L4 one hour after he leaves L3 on a Saturday morning. However, in this case, there is a heavy traffic pattern along the predicted route from L3 to L4, so the mobile device will modify the predicted time of arrival accordingly (e.g. from 1 to 2 hours).

Other ways to predict the route of the mobile device may also be used with this invention. For example, the pattern of the locations stored in the location log may be analyzed over time to predict a geometrical progression. As shown in FIG. 2d, the locations L1, L2 and L3 all provide a linear progression, so the mobile device extrapolates the next stop at L4 along the same linear progression. In an alternative scenario, the mobile device is logged as being at locations L5, L6 and L7. In this case, this geometrical progression suggests that the next stop on the user's route would be at L8 rather than L4.

The mobile device may also ascertain if the user is traveling on a certain roadway as indicated by the locations in the log 212, and with reference to a mapping database as well known in the art. This information may also be used to predict the likely subsequent location of the user.

At step 610, the mobile device determines a merchant proximate to the predicted subsequent location of the mobile device. This may be done with reference to a merchant database 215 that indicates, for each participating merchant, the location of that merchant such as its GPS coordinates. This merchant database may be stored on the mobile device or externally and referenced by the mobile device when necessary. The mobile device can compare the predicted subsequent location to the database of participating merchant locations and determine which merchants are proximate to the predicted subsequent location of the mobile device (e.g. within 0.1 mile. 0.5 mile, etc). As shown in FIG. 2d, merchant 208 has been determined to be proximate to the predicted subsequent location LP of the mobile device 202.

At step 614, the mobile device 202 generates a purchase incentive 207 for use at merchant 208, since that merchant 208 has been determined to be proximate to the predicted subsequent location of the mobile device 202.

Generation of the purchase incentive may occur on the occurrence of a triggering event. There are two main types of triggering events that may be used to initiate generation of the purchase incentive. In one type, referred to as a push embodiment, the triggering event is automated and based on a predetermined condition. This predetermined condition is set by the system designer, and may be for example when there are a certain number of location records received and stored in the location log, or at the time that the mobile device is within a predetermined distance of the predicted subsequent location (e.g. one mile away), etc. In a second type, referred to as a pull embodiment, the purchase incentives are not generated unless and until a user requests it with the mobile device. In this case, the user would press an input on the mobile device, which would cause the mobile device to generate the purchase incentive. These triggering events and conditions are discussed in more detail with respect to the first embodiment above.

A notification may also be generated, which may be visual (display of the incentive or a message indicating the generation of the incentive), audible (a tone may be generated), and/or tactile (the device may be caused to vibrate).

The purchase incentive may be for example a discount or other type of coupon, rebate, offer of reward points, etc. The purchase incentive may be made effective only for a time period associated with the predicted time that the mobile device will be at the predicted location. For example, the incentive may be a $10 discount coupon effective only between 11 AM and 1 PM when it is predicted that the user will arrive at the predicted location at 11 AM. The parameters of the purchase incentive 207 may be predetermined by the merchant 208 and stored in a database that is part of the application being executed on the mobile device, or it may be stored externally and referenced by the mobile device when necessary. The incentive parameters may be based on any factors established by the merchant such as "give all users a 15% discount on Saturdays", or "give all repeat users a $20 coupon for electronics on Friday nights", etc. The user may then present at step 620 the incentive to the merchant 208 to redeem it as part of a purchase transaction at that merchant 208, and at step 622 the merchant 208 receives the incentive 207 from the user's device. This may be accomplished in various ways. For example, the incentive may be transferred from the mobile device 202 to the merchant computer (e.g. a POS terminal) via near field communications (NFC) technology. Or, a bar code such as a QR code may be generated as part of the purchase incentive 207, which could be scanned at the POS terminal and decoded to obtain the purchase incentive parameters such as discount amount, expiration time etc. Or, the incentive 207 may simply be displayed on the mobile device and read by a clerk at the merchant 208 to be applied to the purchase.

In a variation of this fourth embodiment, the merchant computer may at step 612 analyze a prior transaction log 214 associated with the mobile device 202, which includes records of prior transactions executed by the mobile device 202. The specifics of the prior transaction log are discussed above. The prior transaction log is preferably stored at the mobile device 202, but it may also be stored externally such as at a merchant computer 210. Alternatively, the prior transaction log may be stored on an external third party server computer and accessed as needed.

In this variation, the mobile device 202 generates the purchase incentive at step 614 based also on the prior transaction log 214. For example, the merchant 208 may establish that all users who have made twenty or more purchases at that merchant be given a greater discount than those users who have made less than twenty purchases at that merchant. In another example, the purchase incentive is based on a type of prior transactions executed by the mobile device, or, the purchase incentive is based on a value of prior transactions executed by the mobile device. In another example, the mobile device 202 may generate a purchase incentive for use with a merchant associated with the prior transaction log, or for use with a merchant not associated with the prior transaction log.

What is claimed is:

1. A method of operating a mobile device comprising:
a mobile device analyzing GPS coordinate data from a GPS receiver on the mobile device to determine a plurality of locations of the mobile device as the mobile device travels along a route and an associated timeframe when the mobile device is at each of the plurality of locations;
the mobile device recording the plurality of locations and associated timeframes in a location log stored on the mobile device;
the mobile device analyzing the location log to predict a subsequent location of the mobile device and an associated timeframe that the mobile device will be at the subsequent location;
the mobile device determining a merchant proximate to the predicted subsequent location of the mobile device; and
the mobile device generating a purchase incentive for use by the mobile device at the merchant determined to be proximate to the predicted subsequent location of the mobile device.

2. The method of claim 1 wherein the mobile device generates a purchase incentive for use by the mobile device at the merchant on the occurrence of a triggering event.

3. The method of claim 2 wherein the triggering event comprises a predetermined condition.

4. The method of claim 2 wherein the triggering event comprises receipt of a user request to the mobile device.

5. The method of claim 1 wherein the purchase incentive is effective only for the timeframe associated with the predicted subsequent location.

6. The method of claim 1 further comprising:
the mobile device analyzing a prior transaction log associated with the mobile device, the prior transaction log comprising records of prior transactions executed by the mobile device; and
the mobile device generating the purchase incentive based on the prior transaction log.

7. The method of claim 6 wherein the purchase incentive is generated for use with a merchant associated with the prior transaction log.

8. The method of claim 6 wherein the purchase incentive is generated for use with a merchant not associated with the prior transaction log.

9. The method of claim 6 wherein the purchase incentive is based on a type of prior transactions executed by the mobile device.

10. The method of claim 6 wherein the purchase incentive is based on a value of prior transactions executed by the mobile device.

11. The method of claim 6 wherein the prior transaction log is stored on the mobile device.

12. The method of claim 6 wherein the prior transaction log is stored on a merchant computer.

13. The method of claim 1 wherein the step of the mobile device analyzing the location log to predict a subsequent location of the mobile device and an associated timeframe that the mobile device will be at the subsequent location comprises the mobile device analyzing a frequency of the locations occurring in the location log.

14. The method of claim 1 wherein the mobile device is a smart card.

15. The method of claim 1 wherein the mobile device is a handheld computing device.

16. The method of claim 1 wherein the mobile device is a smartphone.

17. The method of claim 1 wherein the mobile device is a tablet computer.

18. The method of claim 1 wherein the associated timeframe when the mobile device is at each of the plurality of locations comprises a duration of time that the mobile device stays at the associated location.

19. The method of claim 1 wherein the associated timeframe when the mobile device is at each of the plurality of locations comprises a single time that the mobile device passes the associated location.

20. A mobile device comprising a GPS receiver, processing circuitry, and a memory, wherein the processing circuitry is programmed to execute an app on the mobile device which performs the steps of:
the mobile device analyzing GPS coordinate data from the GPS receiver to determine a plurality of locations of the mobile device as the mobile device travels along a route and an associated timeframe when the mobile device is at each of the plurality of locations;
the mobile device recording the plurality of locations and associated timeframes in a location log stored in the memory;
the mobile device analyzing the location log to predict a subsequent location of the mobile device and an associated timeframe that the mobile device will be at the subsequent location;
the mobile device determining a merchant proximate to the predicted subsequent location of the mobile device; and
the mobile device generating a purchase incentive for use by the mobile device at the merchant determined to be proximate to the predicted subsequent location of the mobile device.

21. The mobile device of claim 20 wherein the app on the mobile device is programmed to generate a purchase incentive for use by the mobile device at the merchant on the occurrence of a triggering event.

22. The mobile device of claim 21 wherein the triggering event comprises a predetermined condition.

23. The mobile device of claim 21 wherein the triggering event comprises receipt of a user request to the mobile device.

24. The mobile device of claim 20 wherein the purchase incentive is effective only for the timeframe associated with the predicted subsequent location.

25. The mobile device of claim 20 further comprising the app on the mobile device performing the steps of:
the mobile device analyzing a prior transaction log associated with the mobile device, the prior transaction log comprising records of prior transactions executed by the mobile device; and
the mobile device generating the purchase incentive based on the prior transaction log.

26. The mobile device of claim 25 wherein the purchase incentive is generated for use with a merchant associated with the prior transaction log.

27. The mobile device of claim 25 wherein the purchase incentive is generated for use with a merchant not associated with the prior transaction log.

28. The mobile device of claim 25 wherein the purchase incentive is based on a type of prior transactions executed by the mobile device.

29. The mobile device of claim 25 wherein the purchase incentive is based on a value of prior transactions executed by the mobile device.

30. The mobile device of claim 25 wherein the prior transaction log is stored on the mobile device.

31. The mobile device of claim 25 wherein the prior transaction log is stored on an external server computer.

32. The mobile device of claim 20 wherein the mobile device analyzing the location log to predict a subsequent location the mobile device and an associated timeframe that the mobile device will be at the subsequent location comprises analyzing a frequency of the locations occurring in the location log.

33. The mobile device of claim 20 wherein the mobile device is a smart card.

34. The mobile device of claim 20 wherein the mobile device is a handheld computing device.

35. The mobile device of claim 20 wherein the mobile device is a smartphone.

36. The mobile device of claim 20 wherein the mobile device is a tablet computer.

37. The mobile device of claim 20 wherein the associated timeframe when the mobile device is at each of the plurality of locations comprises a duration of time that the mobile device stays at the associated location.

38. The mobile device of claim 20 wherein the associated timeframe when the mobile device is at each of the plurality of locations comprises a single time that the mobile device passes the associated location.

* * * * *